US010606528B2

(12) United States Patent
Nishio

(10) Patent No.: US 10,606,528 B2
(45) Date of Patent: Mar. 31, 2020

(54) INFORMATION PROCESSING APPARATUS, INFORMATION PROCESSING SYSTEM, INFORMATION PROCESSING METHOD, AND NON-TRANSITORY COMPUTER-READABLE STORAGE MEDIUM

(71) Applicant: Masahide Nishio, Kanagawa (JP)

(72) Inventor: Masahide Nishio, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 6 days.

(21) Appl. No.: 15/949,535

(22) Filed: Apr. 10, 2018

(65) Prior Publication Data
US 2018/0314475 A1 Nov. 1, 2018

(30) Foreign Application Priority Data

Apr. 27, 2017 (JP) ................................. 2017-088724
Aug. 10, 2017 (JP) ................................. 2017-156154

(51) Int. Cl.
*G06F 3/12* (2006.01)
*H04N 1/00* (2006.01)
(52) U.S. Cl.
CPC ............ *G06F 3/1225* (2013.01); *G06F 3/122* (2013.01); *G06F 3/1204* (2013.01); *G06F 3/1286* (2013.01); *H04N 1/00411* (2013.01)
(58) Field of Classification Search
CPC .... G06F 3/1225; G06F 3/1286; G06F 3/1204; G06F 3/122; H04N 1/00411; H04N 1/00962; H04N 2201/0046
See application file for complete search history.

(56) References Cited

U.S. PATENT DOCUMENTS

2016/0077770 A1* 3/2016 Morita .................. G06F 3/1253
 358/1.15
2016/0162226 A1* 6/2016 Suzuki .................. G06F 3/1225
 358/1.15

(Continued)

FOREIGN PATENT DOCUMENTS

JP 2014-106563 6/2014
JP 2016-035658 3/2016

*Primary Examiner* — Kent Yip
(74) *Attorney, Agent, or Firm* — Harness, Dickey & Pierce, P.L.C.

(57) ABSTRACT

An information processing apparatus includes a memory and circuitry. The memory includes a storage area corresponding to a printer driver. The storage area includes a plurality of entries in which information is storable from the printer driver. The printer driver is configured to, when executed by the information processing apparatus, instruct an image processing apparatus to perform image processing. The circuitry controls storage of additional information in at least one entry of the plurality of entries. The circuitry stores in the storage area association information that associates identification information of the additional information stored in the at least one entry with the at least one entry storing the additional information. The circuitry specifies the at least one entry storing the additional information, based on the association information and the identification information of the additional information. The circuitry acquires the additional information from the at least one entry specified.

17 Claims, 27 Drawing Sheets

(56) References Cited

U.S. PATENT DOCUMENTS

2016/0162235 A1* 6/2016 Saigusa ............... G06F 3/1205
   358/1.15
2016/0224293 A1* 8/2016 Nakagawa ........... G06F 3/1239
2018/0077305 A1  3/2018 Nishio

* cited by examiner

FIG. 7A

```
<?xml version="1.0" encoding="utf-8"?>
<Properties xmlns="http://schemas.microsoft.com/windows/2011/08/printing/queueproperties">
    <Property Name="ReservedEntryMap"><String></String></Property>
    <Property Name="ReservedEntry001"><String></String></Property>
    <Property Name="ReservedEntry002"><String></String></Property>
    <Property Name="ReservedEntry003"><String></String></Property>
        ...
    <Property Name="ReservedEntry197"><String></String></Property>
    <Property Name="ReservedEntry198"><String></String></Property>
    <Property Name="ReservedEntry199"><String></String></Property>
    <Property Name="ReservedEntry200"><String></String></Property>
</Properties>
```

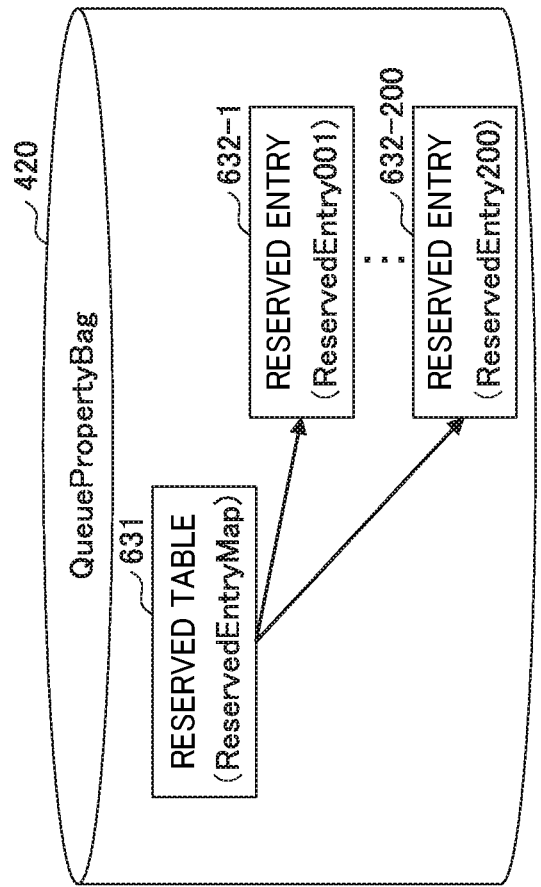

FIG. 10

```
{
"Information_1": "ReservedEntry001",
"Information_2": ["ReservedEntry002","ReservedEntry003","ReservedEntry004"],
"Information_3": "ReservedKey005",
     ⋮
}
```

FIG. 14A

```
[
  "extend_model_list": "ReservedEntry001",         ← 1413
  "finisherA_graphic": ["ReservedEntry002","ReservedEntry003","ReservedEntry004"],  ← 1416
  "modelxxx_wording": "ReservedEntry005",          ← 1414
  "modelyyy_wording": "ReservedEntry006",
  ...
  "modelxxx_capability": "ReservedEntry010",       ← 1415
]
```
631, 1411, 1412

FIG. 14B

```
["model xxx", "model yyy", "model zzz"]
```
1421

FIG. 14C

```
{"finisherA":"Binder", "finisherB":"Folding Finisher", ...}
```
1431, 1432

FIG. 15

| NAME | TYPE | DATA |
|---|---|---|
| (Default) | | (No Value Set) |
| ReservedEntryMap | REG_SZ | ["extend_model_list":"ReservedEntry001", "finisherA |
| ReservedEntry001 | REG_SZ | ["model xxx", "model yyy", "model zzz", |
| ... | ... | ... |
| ReservedEntry005 | REG_SZ | ["finisherA":"Binder", "finisherB":"Folding Finisher", |
| ReservedEntry010 | REG_SZ | ["finisherA":["type":"pickone", "value": |
| ... | ... | ... |

1500

1501 — ReservedEntryMap
1502 — ReservedEntry001
1503 — ReservedEntry005
1504 — ReservedEntry010

FIG. 21A

```
<item category="feature" name="orientation" type="pickone" default="portrait">
    <pickone name="portrait"/>
    <pickone name="landscape"/>
</item>
<item category="feature" name="layout" type="pickone" default="1pagepersheet">
    <constraints "booklet != off"/>
    <pickone name="1pagepersheet"/>
    <pickone name="2pagepersheet"/>
    <pickone name="4pagepersheet"/>
</item>
...
```

- 2110 (whole block)
- 2111: orientation item
- 2112: layout item
- 2113: default="portrait"
- 2114: default="1pagepersheet"
- 2115: constraints

FIG. 21B

```
{
    "pt_name": "ns0000:PageMediaSizeMediaSizeHeight",
    "dm_name": "custompapersize_length_mm"
},
{
    "pt_name": "psk:JobCopiesAllDocuments",
    "dm_name": "copies"
},
{
    "pt_name": "psk:PageOrientation",
    "dm_name": "orientation",
    "pickone": [
        {"pt_name": "psk:Portrait", "dm_name": "portrait"},
        {"pt_name": "psk:Landscape", "dm_name": "landscape"}
    ]
},
...
```

- 2120 (whole block)
- 2121: JobCopiesAllDocuments entry
- 2122: PageOrientation entry

INFORMATION PROCESSING APPARATUS, INFORMATION PROCESSING SYSTEM, INFORMATION PROCESSING METHOD, AND NON-TRANSITORY COMPUTER-READABLE STORAGE MEDIUM

CROSS-REFERENCE TO RELATED APPLICATIONS

This patent application is based on and claims priority pursuant to 35 U.S.C. § 119(a) to Japanese Patent Application Nos. 2017-088724, filed on Apr. 27, 2017, and 2017-156154, filed on Aug. 10, 2017, in the Japan Patent Office, the entire disclosure of each of which is hereby incorporated by reference herein.

BACKGROUND

Technical Field

Embodiments of the present disclosure relate to an information processing apparatus, an information processing system, an information processing method, and a non-transitory computer-readable storage medium.

Related Art

In Windows (registered trademark) Operating Systems (OSs) from Windows 2000 to Windows 7, a printer driver architecture called a Version 3 (hereinafter referred to as "V3") printer driver is adopted. In Windows 8 and later versions of Windows OS, a new printer driver architecture called a Version 4 (hereinafter referred to as "V4") printer driver is adopted in addition to the V3 printer driver.

For the information processing apparatus that executes the common V3 printer driver, new information, such as information on new image forming apparatus models, may be added to a storage area readable by the V3 printer driver. For the information processing apparatus that executes the V4 printer, however, addition of new information to a storage area readable by the V4 printer driver has some difficulties.

SUMMARY

In one embodiment of the present disclosure, a novel information processing apparatus includes a memory and circuitry. The memory includes a storage area corresponding to a printer driver. The storage area includes a plurality of entries in which information is storable from the printer driver. The printer driver is configured to, when executed by the information processing apparatus, instruct an image processing apparatus to perform image processing. The circuitry is configured to control storage of additional information in at least one entry of the plurality of entries. The circuitry is configured to store in the storage area association information that associates identification information of the additional information stored in the at least one entry with the at least one entry storing the additional information. The circuitry is configured to specify the at least one entry storing the additional information, based on the association information and the identification information of the additional information. The circuitry is configured to acquire the additional information from the at least one entry specified.

Also described are a novel image processing system incorporating the information processing apparatus, a novel method for processing information to be used by a printer driver executable on an information processing apparatus, and a novel non-transitory computer-readable storage medium storing a computer-readable product that causes an information processing apparatus to execute a method for processing information to be used by a printer driver.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 7A is a diagram of an example of a configuration file according to the first embodiment;

FIG. 7B is a diagram of an image of a reserved table and reserved entries according to the first embodiment;

FIG. 10 is a diagram of an example of the reserved table updated according to the first embodiment;

FIG. 14A is a diagram of an image of the reserved table according to the second embodiment;

FIG. 14B is a diagram of an image of a model list stored in a reserved entry;

FIG. 14C is a diagram of an image of a model wording stored in a reserved entry;

FIG. 15 is a diagram of an image of a QueuePropertyBag according to the second embodiment;

FIG. 21A is a diagram of an example of model capability information according to the third embodiment;

FIG. 21B is a diagram of an example of a conversion table according to the third embodiment;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
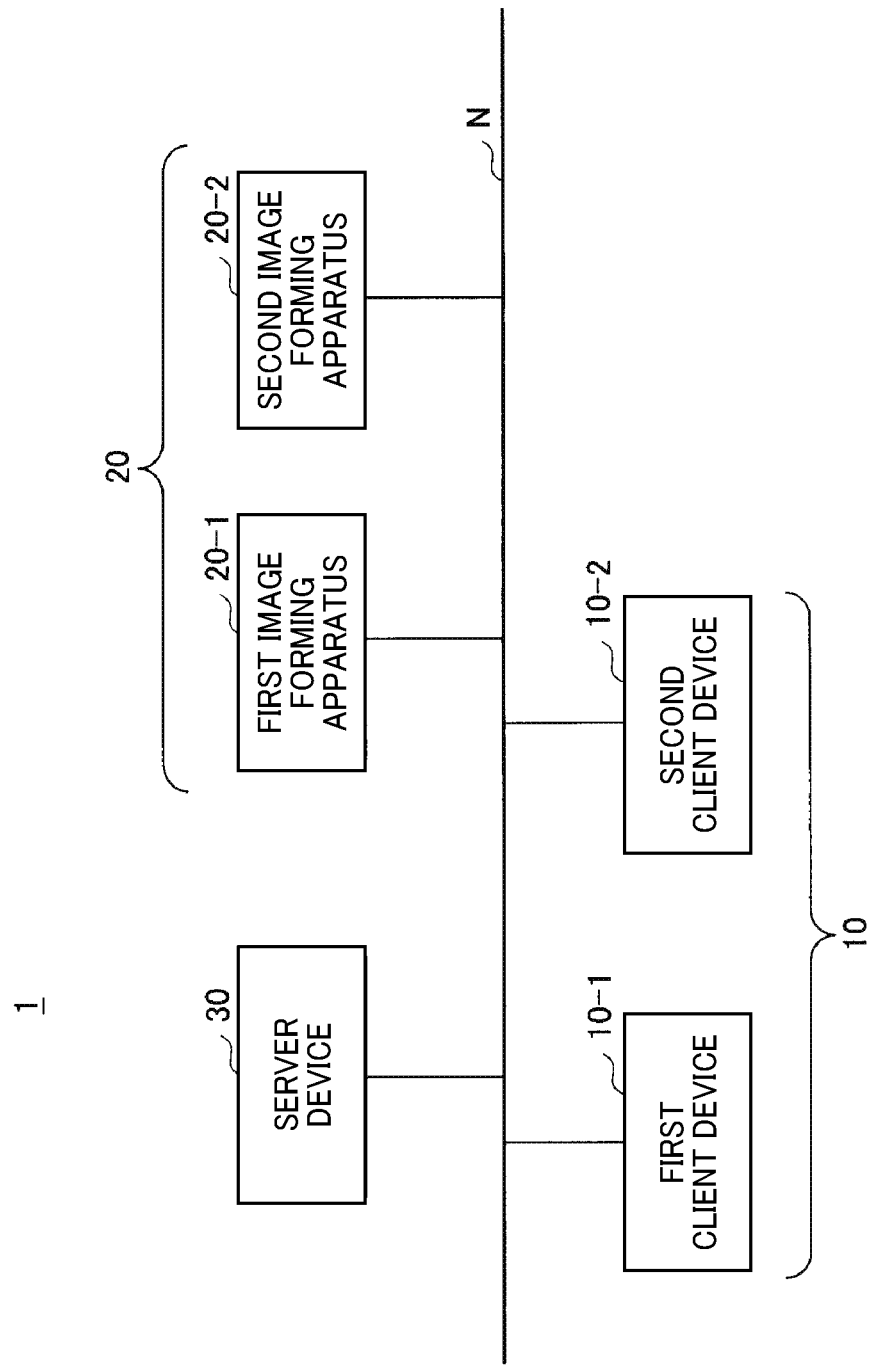
FIG. 1 is a block diagram of a system configuration of an information processing system according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring to the drawings, wherein like reference numerals designate identical or corresponding parts throughout the several views, embodiments of the present disclosure are described below.

<System Configuration>

Initially with reference to FIG. 1, a description is given of a system configuration of an information processing system 1 according to an embodiment of the present disclosure.

FIG. 1 is a block diagram of the system configuration of the information processing system 1.

As illustrated in FIG. 1, the information processing system 1 of the present embodiment includes at least one client device 10, at least one image forming apparatus 20, and a server device 30. The at least one client device 10, the at least one image forming apparatus 20, and the server device 30 are communicably connected to each other via a network N such as a local area network (LAN).

The client device 10 is, e.g., a personal computer (PC), a smartphone, or a tablet terminal. For example, in response to a print instruction from, e.g., a user, the client device 10 generates print data from print target data, and transmits the print data to the image forming apparatus 20. Alternatively, for example, in response to a print instruction from, e.g., a user, the client device 10 transmits print target data to the server device 30.

Note that the print target data is, e.g., printable electronic data such as image data or document data. On the other hand, the print data is, e.g., electronic data in a page description language (PDL) format into which the print target data is converted so as to be printable with the image forming apparatus 20.

The image forming apparatus 20 is, e.g., a printer, or a multifunction peripheral (MFP) having at least two of copying, printing, scanning, facsimile, and plotter functions. Upon receiving the print data from the client device 10 or the server device 30, the image forming apparatus 20 prints the print data.

The server device 30 is, e.g., a PC. For example, the server device 30 generates print data from the print target data received from the client device 10, and transmits the print data to the image forming apparatus 20.

The server device 30 may function as a file server. That is, for example, the server device 30 may store the print data received from the client device 10. In response to a request from the image forming apparatus 20, the server device 30 may transmit the print data thus stored to the request source, that is, the image forming apparatus 20.

Note that, in the following description, the at least one client device 10 may be referred to as a first client device 10-1 and a second client device 10-2. Similarly, the at least one image forming apparatus 20 may be referred to as a first image forming apparatus 20-1 and a second image forming apparatus 20-2.

<Hardware Configuration>

Figure 2:
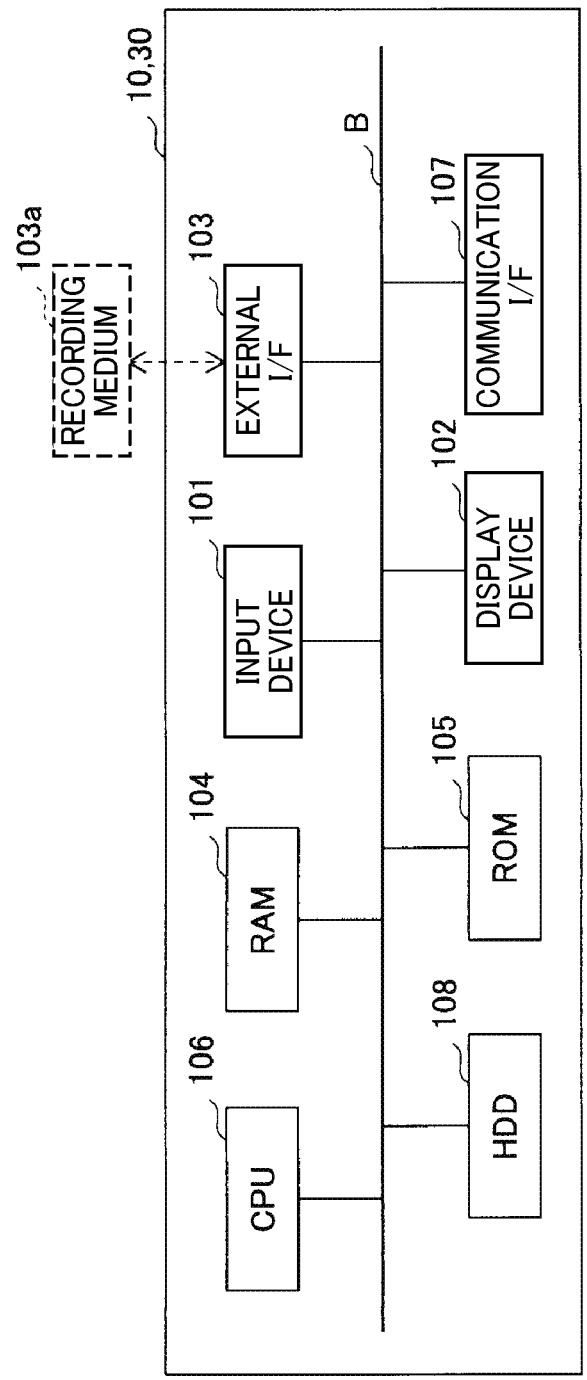
FIG. 2 is a block diagram of a hardware configuration of a client device and a server device illustrated in FIG. 1.
Figure 3:
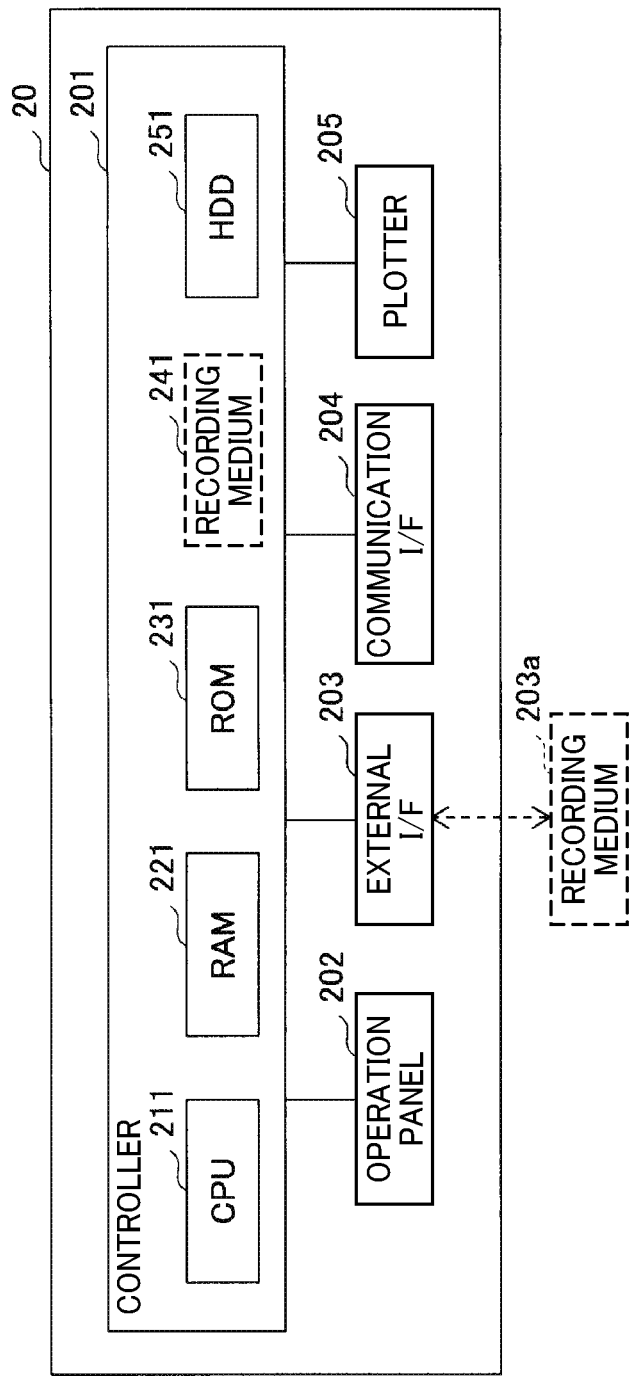
FIG. 3 is a block diagram of a hardware configuration of an image forming apparatus illustrated in FIG. 1.

Referring now to FIGS. 2 and 3, a description is given of hardware configurations of the client device 10, the image forming apparatus 20, and the server device 30 in the information processing system 1 described above.

<<Client Device 10 and Server Device 30>>

Firstly, referring to FIG. 2, a description is given of a hardware configuration of the client device 10 and the server device 30.

FIG. 2 is a block diagram of the hardware configuration of the client device 10 and the server device 30.

Note that, since the client device 10 and the server device 30 have substantially the same hardware configurations, a description is now given of only the hardware configuration of the client device 10.

As illustrated in FIG. 2, the client device 10 of the present embodiment includes an input device 101, a display device 102, an external interface (I/F) 103, and a random access memory (RAM) 104. The client device 10 further includes a read only memory (ROM) 105, a central processing unit (CPU) 106, a communication I/F 107, and a hard disk drive (HDD) 108. These hardware components are connected to each other via a bus B.

The input device 101 includes, e.g., a keyboard, a mouse, and a touch panel. The input device 101 receives, for example, a user instruction and generates operation signals for the client device 10. The display device 102 includes, e.g., a display. The display device 102 displays results of processing executed by the client device 10. Note that at least one of the input device 101 and the display device 102 may be connected to the client device 10 for use when necessary.

The communication I/F 107 is an interface that connects the client device 10 to the network N. The client device 10 communicates via the communication I/F 107.

The HDD 108 is a non-volatile storage device or memory that stores programs and data. Examples of the programs and the data stored in the HDD 108 include an operating system (OS), which is basic software used for controlling the entire client device 10, and application software that provides various functions on the OS.

Note that, instead of the HDD 108, the client device 10 may include a drive device (e.g., solid state drive (SSD)) that uses a flash memory as a recording medium. The HDD 108 manages the programs and the data stored therein with a file system or a database (DB).

The external I/F 103 is an interface between the client device 10 and an external device. Examples of the external device include a recording medium 103*a*. The client device 10 reads and writes the recording medium 103*a* via the external I/F 103. Examples of the recording medium 103*a* include a flexible disc, a compact disc (CD), a digital versatile disc (DVD), a secure digital (SD) memory card, and a universal serial bus (USB) memory.

The ROM 105 is a nonvolatile semiconductor memory that retains programs and data even when the power is turned off. The ROM 105 stores, e.g., programs and data for, e.g., OS and network settings, and a basic input/output system (BIOS) that is executed upon start-up of the client device 10. The RAM 104 is a volatile semiconductor memory that temporarily retains programs and data.

The CPU 106 is an arithmetic device that reads programs and data from a storage device or memory such as the ROM 105 and the HDD 108 onto the RAM 104, and executes processing based on the programs and the data, thereby controlling the entire client device 10 and implementing other functions of the client device 10.

The client device 10 and the server device 30 of the present embodiment implements various kinds of processing as described later with the hardware configuration illustrated in FIG. 2.

<<Image Forming Apparatus 20>>

Referring now to FIG. 3, a description is given of a hardware configuration of the image forming apparatus 20.

FIG. 3 is a block diagram of the hardware configuration of the image forming apparatus 20.

As illustrated in FIG. 3, the image forming apparatus 20 of the present embodiment includes a controller 201, an operation panel 202, an external I/F 203, a communication I/F 204, and a plotter 205. The controller 201 includes a CPU 211, a RAM 221, a ROM 231, a non-volatile random access memory (NVRAM) 241, and an HDD 251.

The ROM 231 is a non-volatile semiconductor memory that stores various kinds of programs and data. The RAM 221 is a volatile semiconductor memory that temporarily retains programs and data. The NVRAM 241 stores, e.g., setting information. The HDD 251 is a non-volatile storage device or memory that stores various kinds of programs and data.

The CPU 211 is an arithmetic device that reads, e.g., programs, data, and setting information from, e.g., the ROM 231, the NVRAM 241, and the HDD 251 onto the RAM 221, and executes processing based on the programs and data, thereby controlling the entire image forming apparatus 20 and implementing other functions of the image forming apparatus 20.

The operation panel 202 includes an input unit that receives an input from, e.g., a user and a display unit that performs displaying. The external I/F 203 is an interface between the image forming apparatus 20 and an external device. Examples of the external device include a recording medium 203*a*. The image forming apparatus 20 reads and writes the recording medium 203*a* via the external I/F 203. Examples of the recording medium 203*a* include an integrated circuit (IC) card, a flexible disc, a CD, a DVD, an SD memory card, and a USB memory.

The communication I/F 204 is an interface that connects the image forming apparatus 20 to the network N. The image forming apparatus 20 communicates via the communication I/F 204. The plotter 205 is a printer that prints print data.

The image forming apparatus 20 of the present embodiment implements various kinds of processing as described later with the hardware configuration illustrated in FIG. 3.

<Software Configuration of Client Device 10>

Figure 4:
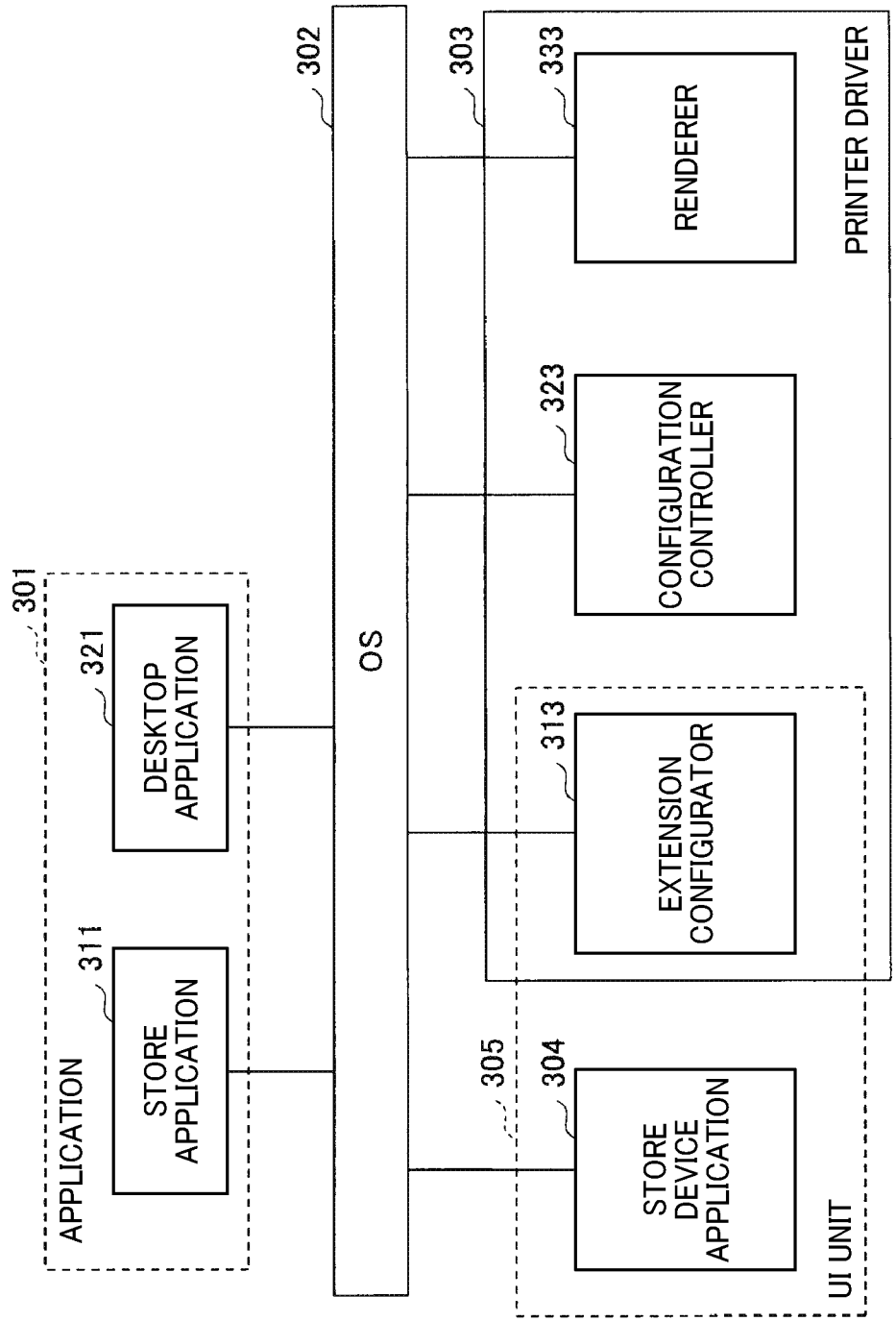
FIG. 4 is a block diagram of a software configuration of the client device illustrated in FIG. 1.

Referring now to FIG. 4, a description is given of a software configuration of the client device 10.

FIG. 4 is a block diagram of the software configuration of the client device 10.

As illustrated in FIG. 4, the client device 10 of the present embodiment includes an application 301, an OS 302, a printer driver 303, and a store device application 304.

The application 301 is application software, such as document creation software, image viewing/editing software, and a browser, which gives a print instruction (or request) to the OS 302 in response to a print instruction from, e.g., a user. The application 301 includes a store application 311 and a desktop application 321.

The store application 311 is available from "Windows Store" that provides applications to Windows (registered trademark) 8/Windows RT and later versions of Windows OS, for example. In the store application 311, "store application user interface (UI)" is used. Note that, in Windows 8 and Windows 8.1, the store application 311 is retrieved from a user interface (UI) called "Modern UI" or "Metro UI" provided by the OS 302.

On the other hand, the desktop application 321 can be used not only in Windows 8/Windows RT and later versions of Windows OS, but also in Windows 7 and earlier versions of Windows OS, for example.

The OS 302 is Windows 8/Windows RT or later versions of Windows OS.

The printer driver 303 is, e.g., a Version 4 printer driver (hereinafter referred to as "V4 printer driver"). The V4 printer driver is a printer driver based on an architecture adopted from Windows 8/Windows RT. Hereinafter, the printer driver 303 may be referred to as "V4 printer driver 303".

In Windows 8 and later versions of Windows OS, the V4 printer driver can be used in addition to a Version 3 printer driver (hereinafter referred to as "V3 printer driver") that is used in Windows 2000 to Windows 7.

The printer driver 303 includes an extension configurator 313, a configuration controller 323, and a renderer 333.

The extension configurator 313, which is also referred to as printer extension, displays a vendor-specific print setting screen upon printing with the desktop application 321.

The configuration controller 323, which is also referred to as a prohibition script, verifies, e.g., whether or not a combination of print settings is valid. For example, the extension configurator 313 can hide a combination of print settings verified as non-valid by the configuration controller 323.

In response to a request from the application 301, the OS 302, or the like, the configuration controller 323 returns a PrintCapability indicating information of functions that can be set by the printer driver 303. In addition, in response to a request from the application 301, the OS 302, or the like, the configuration controller 323 acquires setting values of various functions set in the printer driver 303 from a DevmodePropertyBag, and returns a PrintTicket indicating the setting values thus acquired. Further, the configuration controller 323 saves the setting values indicated by the PrintTicket in the DevmodePropertyBag.

Note that the PrintCapability and the PrintTicket returned to the OS 302 are used to display, e.g., current values of functions and options on the print setting screen displayed by the extension configurator 313.

The renderer 333 generates print data from print target data of which a print instruction is given by the application 301.

Upon printing with the store application 311, the store device application 304 displays a vendor-specific print setting screen. Note that, like the store application 311, the store device application 304 is available from "Windows store".

Upon printing with the desktop application 321, the printer driver 303 generates print data based on settings input through the print setting screen displayed by the extension configurator 313. By contrast, upon printing with the store application 311, the printer driver 303 generates print data based on settings input through the print setting screen displayed by the store device application 304.

A UI unit 305 is constructed of the extension configurator 313 and the store device application 304. The UI unit 305 displays the vendor-specific print setting screen.

<Storage Area Accessible by V4 Printer Driver 303 and Store Device Application 304>

Figure 5:
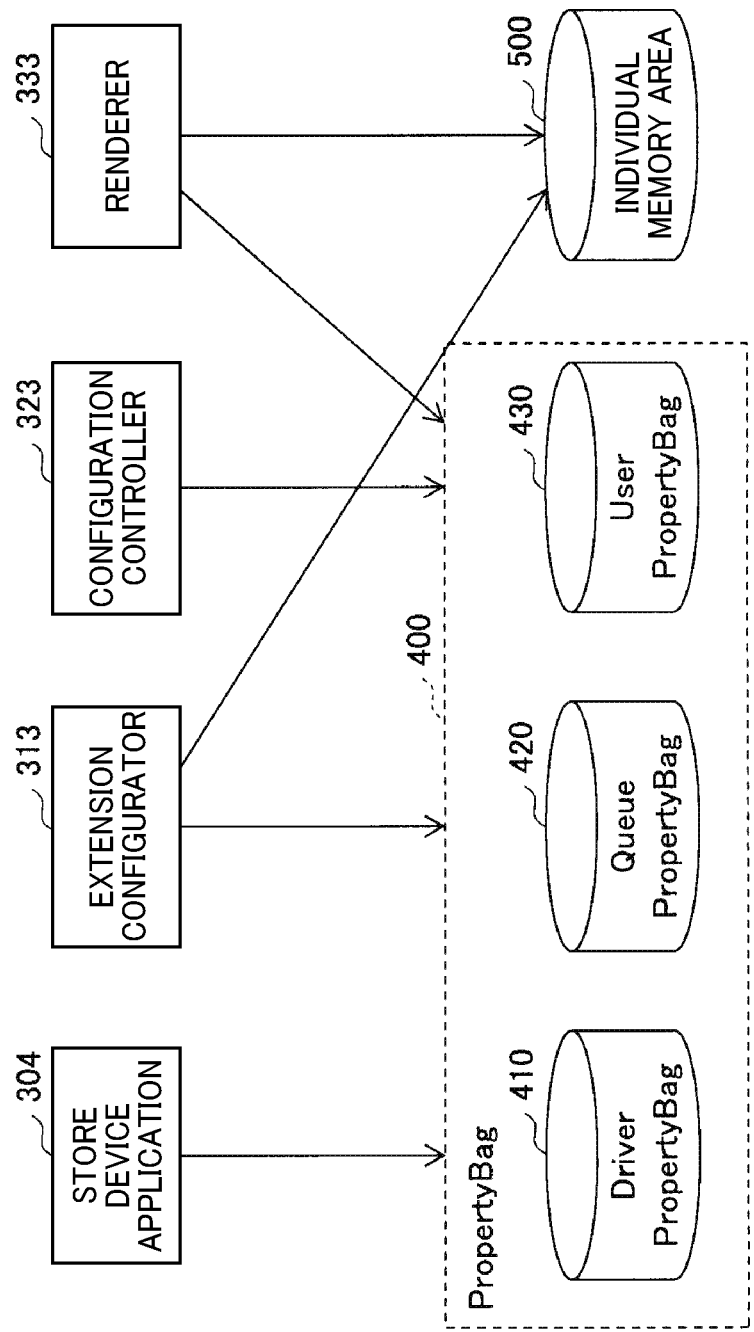
FIG. 5 is a block diagram illustrating storage areas accessible by a V4 printer driver and a store device application in the client device illustrated in FIG. 4.

Referring now to FIG. 5, a description is given of storage areas accessible by the V4 printer driver 303 and the store device application 304.

FIG. 5 is a block diagram illustrating the storage areas accessible by the V4 printer driver 303 and the store device application 304.

As illustrated in FIG. 5, the extension configurator 313, the configuration controller 323, the renderer 333, and the store device application 304 access a storage area that is referred to as a PropertyBag 400. Note that, such access to the storage area can be executed using an Application Programming Interface (API) provided by the OS 302.

As illustrated in FIG. 5, the PropertyBag 400 includes a DriverPropertyBag 410, a QueuePropertyBag 420, and a UserPropertyBag 430.

The DriverPropertyBag 410 is a storage area that stores, e.g., configuration information that is determined upon creating the V4 printer driver 303. The extension configurator 313, the configuration controller 323, the renderer 333, and the store device application 304 are capable of reading various types of information from the DriverPropertyBag 410. However, the extension configurator 313, the configuration controller 323, the renderer 333, and the store device application 304 are incapable of writing information in the DriverPropertyBag 410.

The QueuePropertyBag 420 is a storage area that stores, e.g., setting information for each logical printer (i.e., printer icon).

Each module of the V4 printer driver (e.g., printer driver 303) can access information in the QueuePropertyBag 420. The QueuePropertyBag 420 is defined compatibly with the logical printer in advance.

The extension configurator 313 and the store device application 304 are capable of reading various types of information from the QueuePropertyBag 420 and writing various types of information in the QueuePropertyBag 420. The configuration controller 323 and the renderer 333 are capable of reading various types of information from the QueuePropertyBag 420.

Note that a logical printer is, e.g., a virtual printer that is displayed as a printer icon in, e.g., a printer folder of the OS 302. For example, a user of the client device 10 can create a plurality of logical printers with different configurations (e.g., document size, orientation, and print quality) with respect to a single image forming apparatus 20.

The UserPropertyBag 430 is a storage area that stores, e.g., per-user setting information for each logical printer. The extension configurator 313, the configuration controller 323, and the store device application 304 are capable of reading various types of information from the UserPropertyBag 430 and writing various types of information in the UserPropertyBag 430.

The extension configurator 313 and the renderer 333 are capable of reading various types of information from an individual memory area 500 and writing various types of information in the individual memory area 500.

The individual memory area 500 is implemented using, e.g., a registry and a file. The individual memory area 500 is a storage area that is different from the PropertyBag 400. The individual memory area 500 is defined by, e.g., a vendor that provides the V4 printer driver 303.

Due to restrictions by the OS 302, the store device application 304 is incapable of accessing a storage area other than the PropertyBag 400. The configuration controller 323 is incapable of accessing a storage area other than the above-described DevmodePropertyBag and the PropertyBag 400. That is, the store device application 304 and the configuration controller 323 are incapable of reading information from the individual memory area 500 or writing information in the individual memory area 500.

This is the same as restrictions on the store application 311. The restrictions prevent the store device application 304 and the configuration controller 323 from changing the registry or the like used by the OS 302 and adversely affecting the operation of the OS 302, for example. Such a mechanism is referred to as a sandbox, for example.

[First Embodiment]

A description is now given of a first embodiment, including the basic configuration and processing of the embodiments of the present disclosure.

<Functional Configuration>

Referring now to FIGS. 6A through 7B, a description is given of a functional configuration of the client device 10 according to the first embodiment.

Figure 6A:
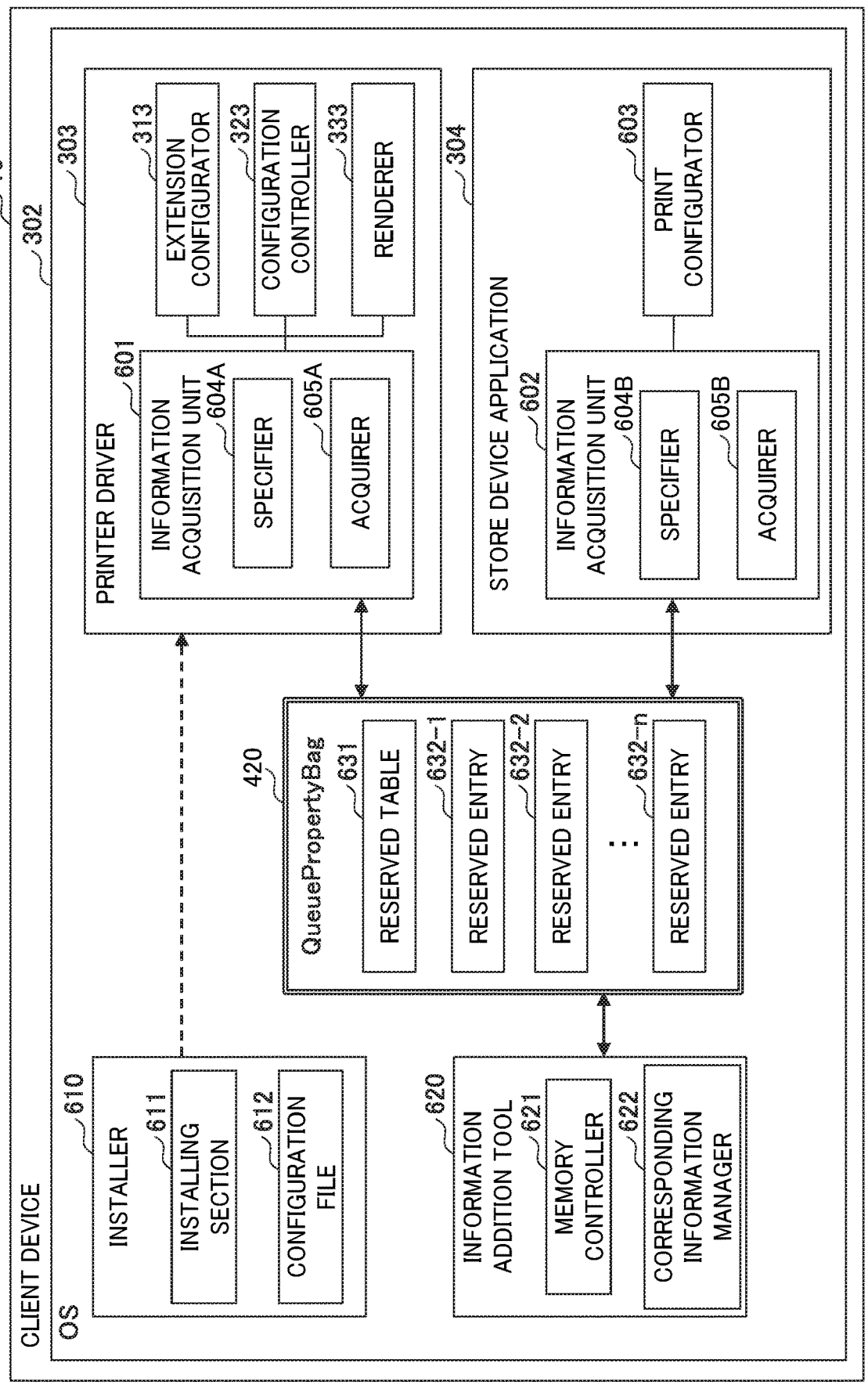
FIG. 6A is a block diagram of an example of a functional configuration of the client device according to a first embodiment.

Initially with reference to FIG. 6A, a description is given of an example of the functional configuration of the client device 10 according to the first embodiment.

FIG. 6A is a block diagram of an example of the functional configuration of the client device 10.

The client device 10 is an information processing apparatus that executes programs such as an installer 610, an information addition tool 620, the printer driver 303, and the store device application 304 described above.

The installer 610 is implemented by a program executed by the CPU 106 of FIG. 2, for example. The installer 610 includes, e.g., an installing section 611 and a configuration file 612.

The installing section 611 executes an installing process including copying and registering, e.g., the printer driver 303 and the configuration file 612 to the client device 10 for use.

The configuration file 612 defines information to be stored in the QueuePropertyBag 420, which is a storage area corresponding to the logical printer (i.e., printer icon) of the printer driver 303.

In the configuration file 612, information of a reserved table 631 and a plurality of reserved entries 632-1 through 632-n that is to be stored in the QueuePropertyBag 420 is defined in, e.g., an extensible markup language (XML) format. Note that the "n" is an integer not smaller than 1. Note that, in the following description, any one or more reserved entries of the plurality of reserved entries 632-1 to 632-n may be referred to as "reserved entry 632" or "reserved entries 632".

The reserved entry 632 is a registry entry prepared in advance in the QueuePropertyBag 420, which is a storage area corresponding to the logical printer of the printer driver 303. The reserved entry 632 is an area in which the information addition tool 620 and the like are capable of writing or storing arbitrary information.

The reserved table 631 is information that associates an identifier of information stored in the reserved entry 632 with the reserved entry 632 storing the information. The reserved table 631 is stored in, e.g., a registry entry prepared in advance in the QueuePropertyBag 420.

For example, the information addition tool 620 stores predetermined information (e.g., information A) in at least one reserved entry 632 of the plurality of reserved entries 632-1 to 632-n. In the present disclosure, the predetermined information is any additional information to be added to a storage area accessible from the printer driver on the client device 10. More specific examples of such additional information are described in the following, such as the example case in which information on new models is added. The information addition tool 620 stores, in the reserved table 631, an identifier of the information A stored in at least one reserved entry 632 and information of the at least one reserved entry 632 storing the information A, in association with each other. Note that the information identifier is information in a given format used by, e.g., the information addition tool 620, the printer driver 303, and the store device application 304 to specify the information.

Accordingly, the printer driver 303, the store device application 304, and the like can specify the reserved entry 632 storing the information A with reference to the reserved table 631, thereby acquiring the information A from the reserved entry 632 thus specified.

FIG. 7A is a diagram of an example of the configuration file 612.

In the present example of the configuration file 612 of FIG. 7A, the reserved table 631 and the plurality of reserved entries 632 to be stored in the QueuePropertyBag 420 are defined.

In the configuration file 612 of FIG. 7A, information of "Property Name="ReservedEntryMap"" 711 defines the reserved table 631 of the QueuePropertyBag 420. With this information, the reserved table 631 becomes available in the QueuePropertyBag 420 as illustrated in FIG. 7B, for example.

"Property Name="ReservedEntry001 "" 712 through "Property Name="ReservedEntry200 "" 713 are information that defines the plurality of reserved entries 632. In the present example of FIG. 7A, 200 reserved entries are defined. With this information, the 200 reserved entries 632-1 through 632-200 become available in the QueuePropertyBag 420 as illustrated in FIG. 7B, for example.

Note that an installing process performed by the installing section 611 allows the OS 302 to recognize the configuration file 612. Accordingly, the printer driver 303, the store device application 304, and the like can access the reserved table 631 and the reserved entry 632 with, e.g., an interface (e.g., IprinterPropertyBag) of the OS 302.

The information addition tool 620 is implemented by a program executed by the CPU 106 of FIG. 2, for example. The information addition tool 620 includes, e.g., a memory controller 621 and a corresponding information manager 622.

The memory controller 621 controls storage of predetermined information (i.e., additional information) in at least one reserved entry 632. For example, the memory controller 621 controls reading of the reserved table 631 stored in the QueuePropertyBag 420 and writing of the predetermined information in the reserved entry 632.

The corresponding information manager 622 stores the reserved table 631 serving as association information in the QueuePropertyBag 420. The reserved table 631 associates an identifier, serving as identification information, of the predetermined information stored in the at least one reserved entry 632 with the at least one reserved entry 632 storing the predetermined information.

Note that the memory controller 621 and the corresponding information manager 622 may be included in the extension configurator 313 of the printer driver 303, for example.

The printer driver 303 corresponds to the printer driver 303 illustrated in FIG. 4. The client device 10 executes the printer driver 303 with the CPU 106 of FIG. 2, for example, thereby implementing the extension configurator 313, the configuration controller 323, the renderer 333, and an information acquisition unit 601.

Based on the reserved table 631 stored in the QueuePropertyBag 420, the information acquisition unit 601 acquires the predetermined information from the at least one reserved entry 632 storing the predetermined information. The information acquisition unit 601 includes, e.g., a specifier 604A and an acquirer 605A.

The specifier 604A specifies the at least one reserved entry 632 storing the predetermined information, based on the reserved table 631 (i.e., association information) and the identifier (i.e., identification information) of the predetermined information. For example, the specifier 604A uses, e.g., an interface of the OS 302, thereby acquiring the reserved table 631 from the QueuePropertyBag 420. The specifier 604A specifies the at least one reserved entry 632 storing the predetermined information with reference to the reserved table 631.

The acquirer 605A uses, e.g., an interface of the OS 302, thereby acquiring the predetermined information from the at least one reserved entry 632 specified by the specifier 604A.

Note that FIG. 6A illustrates a single information acquisition unit 601. Alternatively, each of the extension configurator 313, the configuration controller 323, and the renderer 333 may include the information acquisition unit 601. Specifically, the extension configurator 313, the configuration controller 323, and the renderer 333 may include the first information acquisition unit 601-1, the second information acquisition unit 601-2, and the third information acquisition unit 601-3, respectively, as illustrated in FIG. 6B.

Figure 6B:
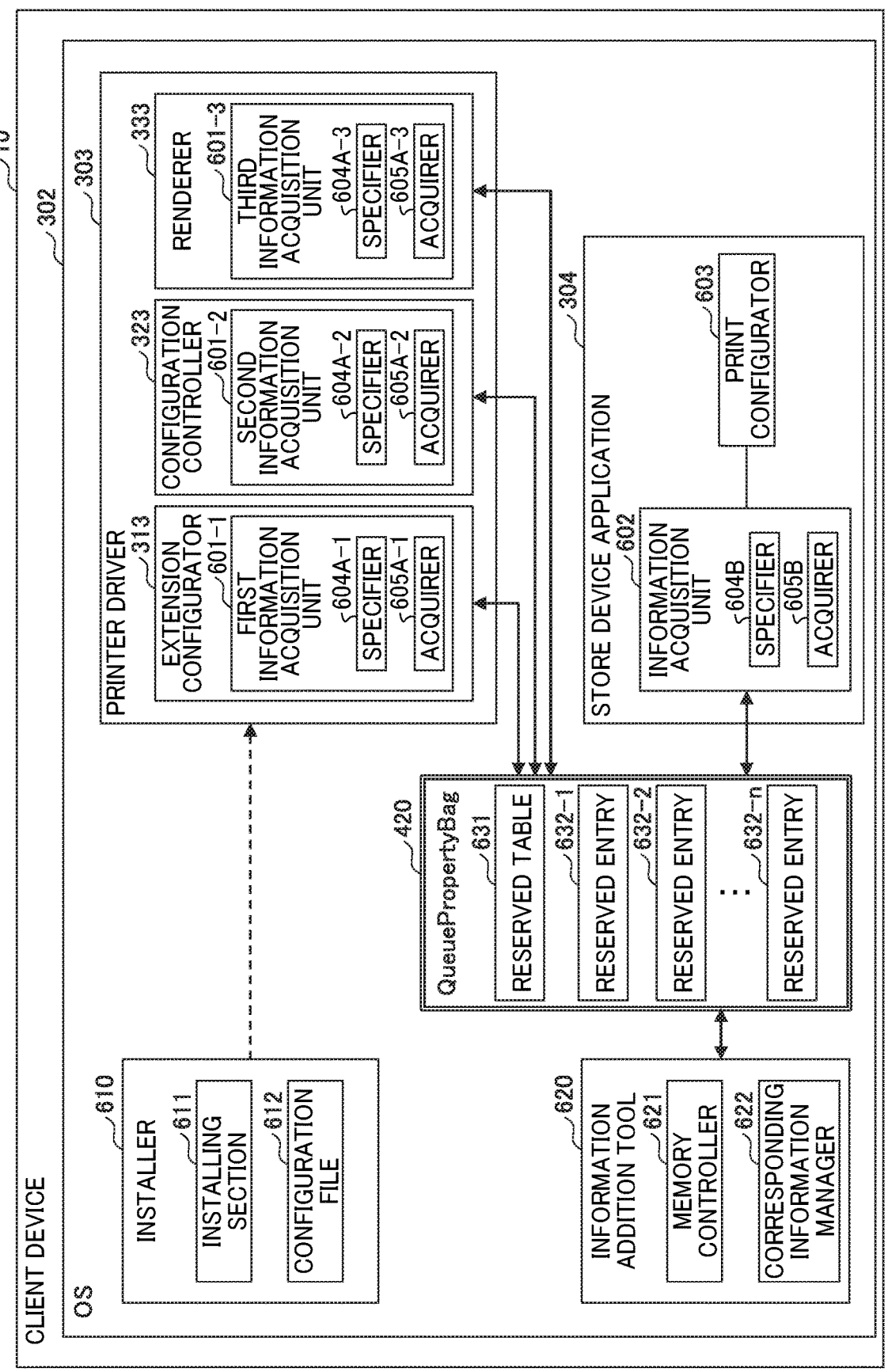
FIG. 6B is a block diagram of another example of the functional configuration of the client device according to the first embodiment.

FIG. 6B is a block diagram of another example of the functional configuration of the client device 10 according to the first embodiment.

In FIG. 6B, the extension configurator 313, the configuration controller 323, and the renderer 333 of the printer driver 303 include a first information acquisition unit 601-1, a second information acquisition unit 601-2, and a third information acquisition unit 601-3, respectively. The first information acquisition unit 601-1 includes a specifier 604A-1 and an acquirer 605A-1. Similarly, the second information acquisition unit 601-2 includes a specifier 604A-2 and an acquirer 605A-2. The third information acquisition unit 601-3 includes a specifier 604A-3 and an acquirer 605A-3. Since each of the specifiers 604A-1, 604A-2, and 604A-3 has a function substantially the same as the function of the specifier 604A, a detailed description thereof is herein omitted. Similarly, since each of the acquirers 605A-1, 605A-2, and 605A-3 has a function substantially the same as the function of the acquirer 605A, a detailed description thereof is herein omitted.

In the present example of FIG. 6B, the first information acquisition unit 601-1 is provided inside the extension configurator 313. Alternatively, the first information acquisition unit 601-1 may be provided outside the extension configurator 313. Similarly, the second information acquisition unit 601-2 may be provided outside the configuration controller 323. Similarly, the third information acquisition unit 601-3 may be provided outside the renderer 333.

The extension configurator 313 serving as a first print configurator corresponds to the extension configurator 313 of FIG. 4. The extension configurator 313 of the present embodiment uses the predetermined information acquired by the information acquisition unit 601 or the first information acquisition unit 601-1 to display, with the desktop application 321, a print setting screen serving as a first setting screen for print setting of the printer driver 303.

The configuration controller 323 corresponds to the configuration controller 323 of FIG. 4. The configuration controller 323 of the present embodiment uses the predetermined information acquired by the information acquisition unit 601 or the second information acquisition unit 601-2 to generate print setting information (e.g., PrintTicket, PrintCapability), that is, setting information for printing with the image forming apparatus 20. Note that the image forming apparatus 20 is an example of an image processing apparatus. Printing is an example of image processing.

The renderer 333 corresponds to the renderer 333 of FIG. 4. The renderer 333 of the present embodiment uses the predetermined information acquired by the information acquisition unit 601 or the third information acquisition unit 601-3 to convert print target data into print data printable with the image forming apparatus 20.

The store device application 304 corresponds to the store device application 304 of FIG. 4. The client device 10 executes the store device application 304 with the CPU 106 of FIG. 2, for example, thereby implementing an information acquisition unit 602 and a print configurator 603.

Like the information acquisition unit 601 of the printer driver 303, the information acquisition unit 602 acquires predetermined information (i.e., additional information) from at least one reserved entry 632 storing the predetermined information, based on the reserved table 631 stored in the QueuePropertyBag 420. Like the information acquisition unit 601, the information acquisition unit 602 includes, e.g., a specifier 604B and an acquirer 605B. Since the specifier 604B included in the information acquisition unit 602 has a function substantially the same as the function of the specifier 604A included in the information acquisition unit 601, a description thereof is herein omitted. Similarly, since the acquirer 605B included in the information acquisition unit 602 has a function substantially the same as the function of the acquirer 605A included in the information acquisition unit 601, a description thereof is herein omitted.

The print configurator 603 serving as a second print configurator uses the predetermined information acquired by the information acquisition unit 602, thereby displaying, with the store application 311, a print setting screen serving as a second setting screen for print setting of the printer driver 303.

<Processing>

Now, a description is given of information processing according to the present embodiment.

(Outline of Processing)

Figure 8:
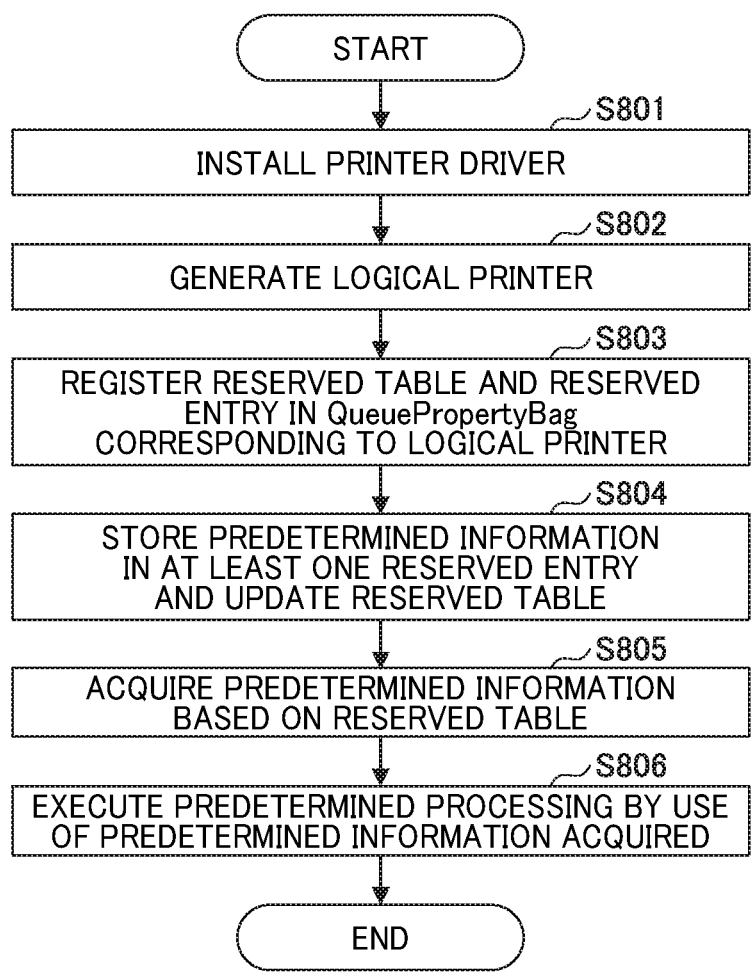
FIG. 8 is a flowchart of an outline of processing performed by the client device according to the first embodiment.

Initially with reference to FIG. 8, a description is given of an outline of the processing.

FIG. 8 is a flowchart of the outline of processing performed by the client device 10 according to the first embodiment.

In other words, FIG. 8 illustrates an example of a procedure taken by the client device 10.

Note that, for the sake of simplicity, FIG. 8 illustrates continuous steps S801 through S806. In actuality, however, these steps are executed according to the usage scene. For example, among the steps illustrated in FIG. 8, steps S801 through S803 may be executed in a scene where the printer driver 303 is installed in the client device 10. Step S804 may be executed in a scene where a model is added to the printer driver 303 installed. Steps S805 and S806 may be executed in a scene where printing is performed with the printer driver 303.

In step S801, when, e.g., a user executes the installer 610 in the client device 10, the installing section 611 of the installer 610 installs the printer driver 303 in the client device 10.

In step S802, the installing section 611 of the installer 610 generates a logical printer (i.e., printer icon) corresponding to the printer driver 303 thus installed.

In step S803, the OS 302 registers the reserved table 631 and the plurality of reserved entries 632 defined in the configuration file 612 in the QueuePropertyBag 420 corresponding to the logical printer thus generated. Accordingly, the reserved table 631 and the plurality of reserved entries 632 becomes available in the QueuePropertyBag 420 corresponding to the logical printer generated.

Figure 9:
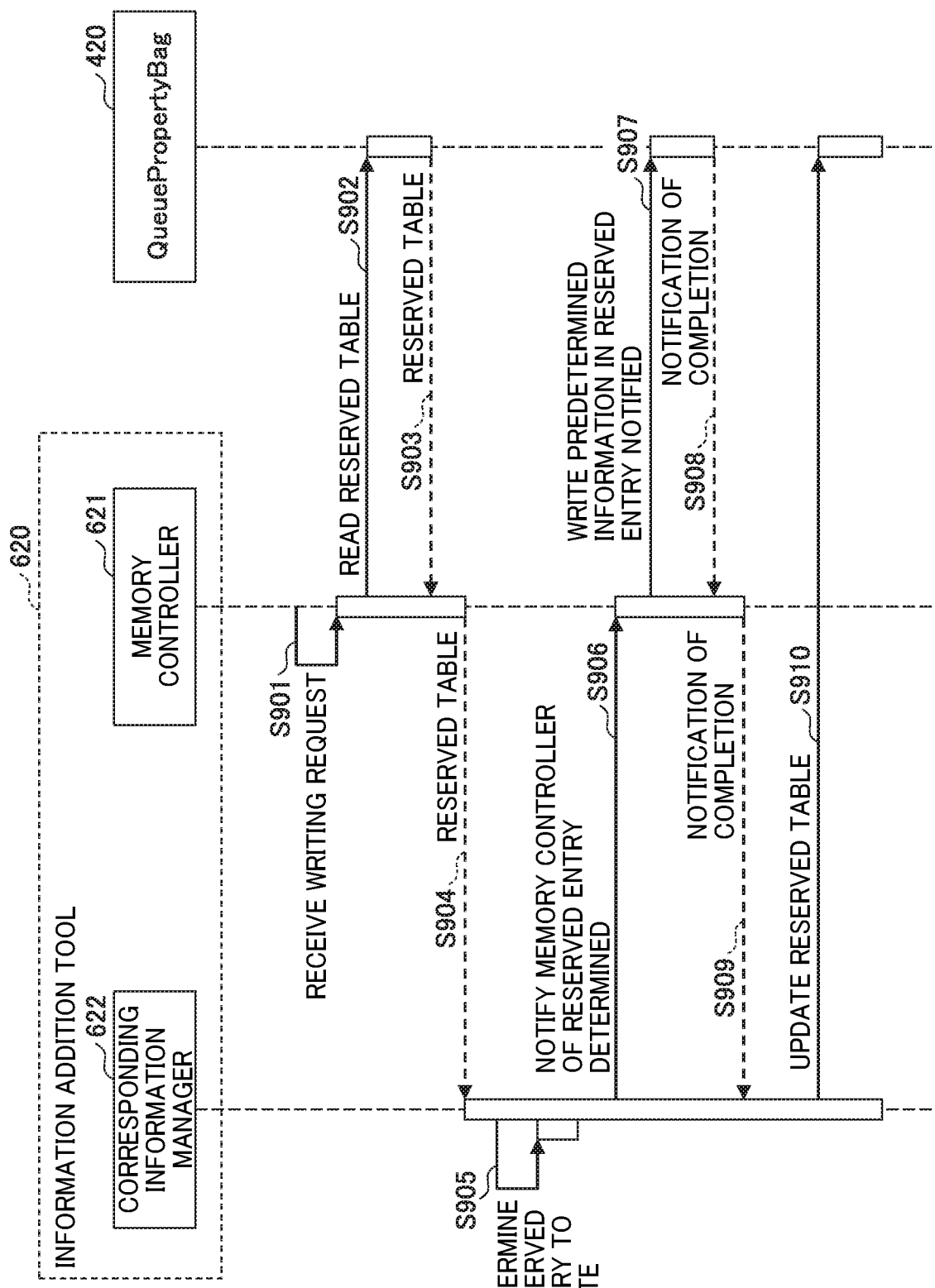
FIG. 9 is a sequence diagram of an example of information writing processing according to the first embodiment.

For example, in step S804, the information addition tool 620 executes information writing processing illustrated in FIG. 9 according to, e.g., user operation, thereby storing predetermined information (i.e., additional information) in at least one reserved entry 632 and updating the reserved table 631.

FIG. 9 is a sequence diagram of an example of the information writing processing according to the first embodiment.

In step S901, the memory controller 621 of the information addition tool 620 receives a writing request to write predetermined information (i.e., additional information), such as a writing operation performed by a user. Thereafter, the client device 10 executes the processing from step S902 and onward.

Specifically, in steps S902 and S903, the memory controller 621 of the information addition tool 620 reads the reserved table 631 from the QueuePropertyBag 420 corresponding to a target logical printer.

In step S904, the memory controller 621 of the information addition tool 620 notifies the corresponding information manager 622 of the reserved table 631 thus read.

In step S905, the corresponding information manager 622 of the information addition tool 620 uses the reserved table 631 thus notified, thereby determining the reserved entry 632 into which the information is to be written. For example, when the reserved entries 632-1 and 632-2 are in use and the reserved entry 632-3 is empty, the corresponding information manager 622 determines the reserved entry 632-3 as the reserved entry 632 into which the information is to be written. Note that the corresponding information manager 622 may choose a reserved entry 632 into which the information is to be written from empty reserved entries 632 using any desired method.

In step S906, the corresponding information manager 622 of the information addition tool 620 notifies the memory controller 621 of the reserved entry 632 thus determined.

In steps S907 and S908, the memory controller 621 of the information addition tool 620 writes predetermined information (i.e., additional information) in the reserved entry 632 thus notified.

In step S909, the corresponding information manager 622 of the information addition tool 620 receives a notification of completion indicating that the writing of the predetermined information is completed.

In step S910, the corresponding information manager 622 of the information addition tool 620 stores, in the reserved table 631, an identifier of the predetermined information written in steps S907 and S908, for example, and information of the reserved entry 632 chosen in association with each other. At least the entry is identifiable with the information of the reserved entry 632.

FIG. 10 is a diagram of an example of the reserved table 631 updated according to the first embodiment.

FIG. 10 illustrates the reserved table 631 storing an identifier 1011 of predetermined information (i.e., additional information) stored in at least one reserved entry 632 and information 1021 of the at least one reserved entry 632 storing the predetermined information in association with each other.

For example, in the present example of the reserved table 631 of FIG. 10, predetermined information (i.e., additional information) corresponding to an information identifier "Information_1" is stored in a reserved entry (i.e., registry entry) "ReservedEntry001".

Note that the QueuePropertyBag 420 is a registry. An upper limit of data amount storable in one reserved entry 632 depends on the OS 302. That is, upon storing information having a data amount larger than the upper limit of the data amount storable in one reserved entry 632, the information addition tool 620 stores one piece of information in the plurality of reserved entries 632.

For example, in the present example of the reserved table 631 of FIG. 10, information corresponding to an information identifier "Information_2" is stored in three reserved entries "ReservedEntry002" through "ReservedEntry004". That is, the identifier "Information_2" is associated with information 1022 of the three reserved entries.

Based on such a reserved table 631, for example, the information acquisition unit 601 of the printer driver 303 and the information acquisition unit 602 of the store device application 304 can acquire predetermined information (i.e., additional information) from the QueuePropertyBag 420. Note that, in the following description, any one of the information acquisition unit 601 and the information acquisition unit 602 may be simply referred to as "information acquisition unit".

Referring back to FIG. 8, a description is continued of the flowchart of the outline of processing performed by the client device 10.

Figure 11:
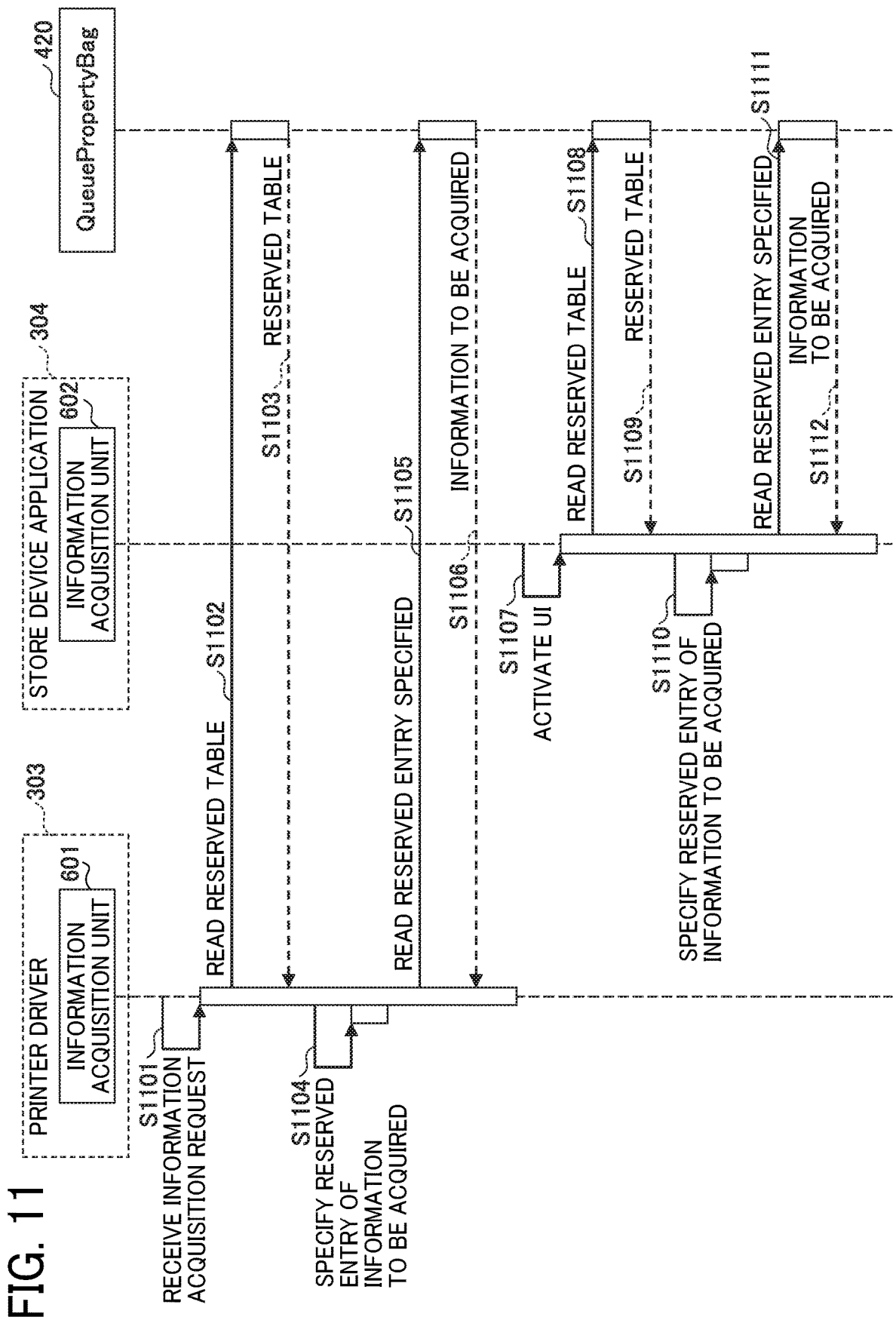
FIG. 11 is a sequence diagram of an example of information acquisition processing according to the first embodiment.

In step S805, at the time of displaying the print setting screen, for example, the information acquisition unit (i.e., information acquisition unit 601 or information acquisition unit 602) executes information acquisition processing illustrated in FIG. 11, thereby acquiring predetermined information (i.e., additional information) based on the reserved table 631.

FIG. 11 is a sequence diagram of an example of the information acquisition processing according to the first embodiment.

Initially, a description is given of an example of information acquisition processing performed by the information acquisition unit 601 of the printer driver 303.

In step S1101, the information acquisition unit 601 of the printer driver 303 receives an information acquisition request from, e.g., the extension configurator 313. Alternatively, the information acquisition unit 601 of the printer driver 303 may receive an information acquisition request from the configuration controller 323, the renderer 333, or the like. Thereafter, the information acquisition unit 601 executes the information acquisition processing of steps S1102 through S1106.

In steps S1102 and S1103, the specifier 604A of the information acquisition unit 601 reads the reserved table 631 from the QueuePropertyBag 420 corresponding to the logical printer of the printer driver 303.

In step S1104, the specifier 604A of the information acquisition unit 601 uses the reserved table 631 thus acquired, thereby specifying the reserved entry 632 of information to be acquired (i.e., information requested from, e.g., the extension configurator 313). For example, in the reserved table 631 illustrated in FIG. 10, if "Information_1" is the identifier of the information to be acquired, then "ReservedEntry001" is the reserved entry 632 of the information to be acquired.

In steps S1105 and S1106, the acquirer 605A of the information acquisition unit 601 reads the reserved entry 632 thus specified, thereby acquiring the information to be acquired.

Next, a description is given of an example of information acquisition processing performed by the information acquisition unit 602 of the store device application 304.

In step S1107, e.g., a print setting screen (hereinafter referred to as UI) is activated from the store application 311. Thereafter, the information acquisition unit 602 of the store device application 304 executes the processing of steps S1108 through S1112.

In steps S1108 and S1109, the specifier 604B of the information acquisition unit 602 reads the reserved table 631 from the QueuePropertyBag 420 corresponding to the logical printer.

In step S1110, the specifier 604B of the information acquisition unit 602 uses the reserved table 631 thus acquired, thereby specifying the reserved entry 632 of information to be acquired (i.e., information for displaying the UI). For example, in the reserved table 631 illustrated in FIG. 10, if "Information_3" is the identifier of the information to be acquired, then "ReservedEntry005" is the reserved entry 632 of the information to be acquired.

In steps S1111 and S1112, the acquirer 605B of the information acquisition unit 602 reads the reserved entry 632 thus specified, thereby acquiring the information to be acquired.

Thus, the information acquisition units (the information acquisition unit 601 and the information acquisition unit 602) can acquire the predetermined information stored in the reserved entry 632 based on the reserved table 631 stored in the QueuePropertyBag 420.

Referring back to FIG. 8, a description is continued of the flowchart of the outline of processing performed by the client device 10.

In step S806, the printer driver 303 (or the store device application 304) executes processing using the predetermined information acquired.

For example, if a request source of the predetermined information is the extension configurator 313 of the printer driver 303, then the extension configurator 313 uses the predetermined information acquired by the information acquisition unit 601, thereby displaying a UI serving as a first print setting screen for print setting of the printer driver 303.

If the request source of the predetermined information is the configuration controller 323 of the printer driver 303, then the configuration controller 323 uses the predetermined information acquired by the information acquisition unit 601, thereby generating print setting information (e.g., Print-Ticket), that is, setting information for printing with the image forming apparatus 20.

If the request source of the predetermined information is the renderer 333 of the printer driver 303, then the renderer 333 uses the predetermined information acquired by the information acquisition unit 601, thereby converting print target data into print data printable with the image forming apparatus 20.

If the request source of the predetermined information is the print configurator 603 of the store device application 304, then the print configurator 603 uses the predetermined information acquired by the information acquisition unit 602, thereby displaying a UI serving as a second print setting screen for print setting of the printer driver 303.

As described above, according to the present embodiment, in the client device 10 serving as an information processing apparatus that executes the printer driver 303 (e.g., V4 printer driver, a printer driver having an architecture equal to the V4 printer driver), new information is added to a storage area corresponding to the logical printer.

For example, in the client device 10 serving as an information processing apparatus that executes the V4 printer driver, new information, such as information on new models of the image forming apparatuses 20, is added to a storage area corresponding to the logical printer. Accordingly, an available model is easily added.

[Second Embodiment]

Now, a description is given of a second embodiment. Specifically, a description is given of a specific application example in which additional model information is added to the V4 printer driver 303 common to the models to add an available model.

As described above with reference to FIG. 5, the printer driver 303 and the store device application 304 can use storage areas such as the DriverPropertyBag 410, the QueuePropertyBag 420, and the UserPropertyBag 430.

Among the DriverPropertyBag 410, the QueueProperty-Bag 420, and the UserPropertyBag 430, information stored in the DriverPropertyBag 410 is determined at the time of shipment of the printer driver 303. Therefore, in principle, the information cannot be changed. Therefore, the DriverPropertyBag 410 is unsuitable for storing additional model information.

The UserPropertyBag 430 is a storage area for storing per-user information. Therefore, the UserPropertyBag 430 is unsuitable for storing the additional model information, which is shared by all users.

By contrast, the QueuePropertyBag 420 is a storage area that exists for each logical printer (i.e., printer icon) and stores information common to all users. Information can be written into the QueuePropertyBag 420 from a program other than the printer driver 303, such as the information addition tool 620. Therefore, the additional model information is desirably stored in the QueuePropertyBag 420.

However, information can be written into the QueuePropertyBag 420 with limited registry entries, which are predefined in the configuration file 612 for the QueuePropertyBag 420 in a driver package.

For example, if the printer driver 303 includes the configuration file 612 as described in an example below, then, e.g., the information addition tool 620 writes information into a registry entry "Initial Settings", so that the information becomes available from the printer driver 303.

(Example)

```
<?xml version="1.0" encoding="utf-8"?>
<Properties xmlns="http://schemas.xxx.com/zzz/yy/
mm/printing/queueproperties">
  <Property Name="InitialSettings">
    <String> </String>
  </Property>
</Properties>
```

However, if a registry entry other than the "Initial Settings" predefined in the configuration file 612 is newly created, e.g., the information addition tool 620 cannot write information therein. Therefore, the printer driver 303 or the store device application 304 cannot read the information.

Not only the V4 printer driver but also various printer drivers having an architecture equal to the V4 printer driver may face such a situation.

Hence, the present embodiment facilitates adding additional model information to the QueuePropertyBag 420 and using the additional model information with the mechanism of the first embodiment described above.

<Functional Configuration>

Figure 12:
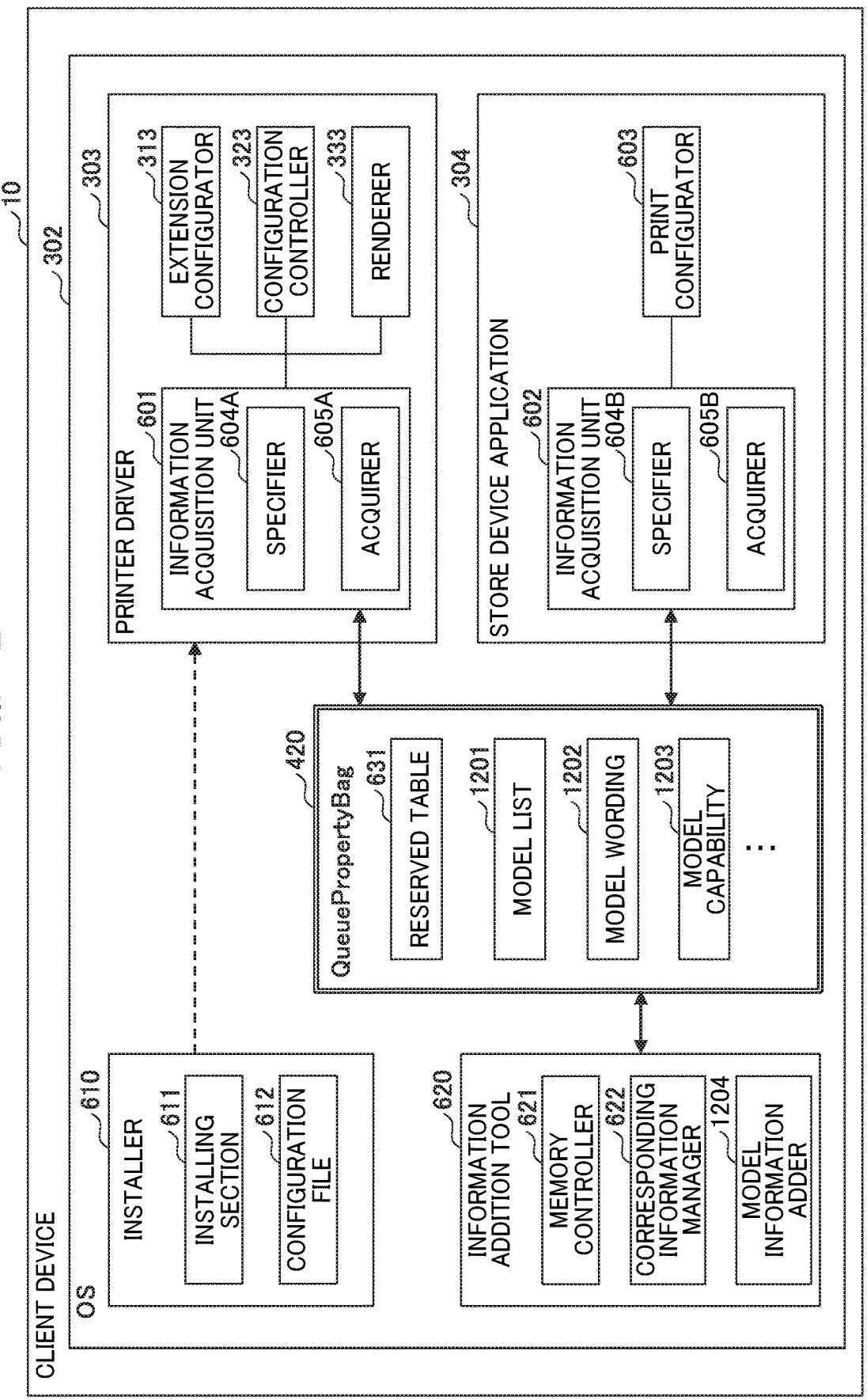
FIG. 12 is a block diagram of a functional configuration of the client device according to a second embodiment.

FIG. 12 is a block diagram of a functional configuration of the client device 10 according to the second embodiment.

The information addition tool 620 of the client device 10 according to the second embodiment includes a model information adder 1204, in addition to the functional configuration of the information addition tool 620 according to the first embodiment illustrated in FIG. 6A. The rest of the functional configuration of the client device 10 is the same as the functional configuration of the client device 10 according to the first embodiment illustrated in FIG. 6A.

FIG. 12 illustrates a single information acquisition unit 601. Alternatively, each of the extension configurator 313, the configuration controller 323, and the renderer 333 may include the information acquisition unit 601. Specifically, the extension configurator 313, the configuration controller 323, and the renderer 333 may include the first information acquisition unit 601-1, the second information acquisition unit 601-2, and the third information acquisition unit 601-3, respectively, as illustrated in FIG. 6B.

Figure 13:
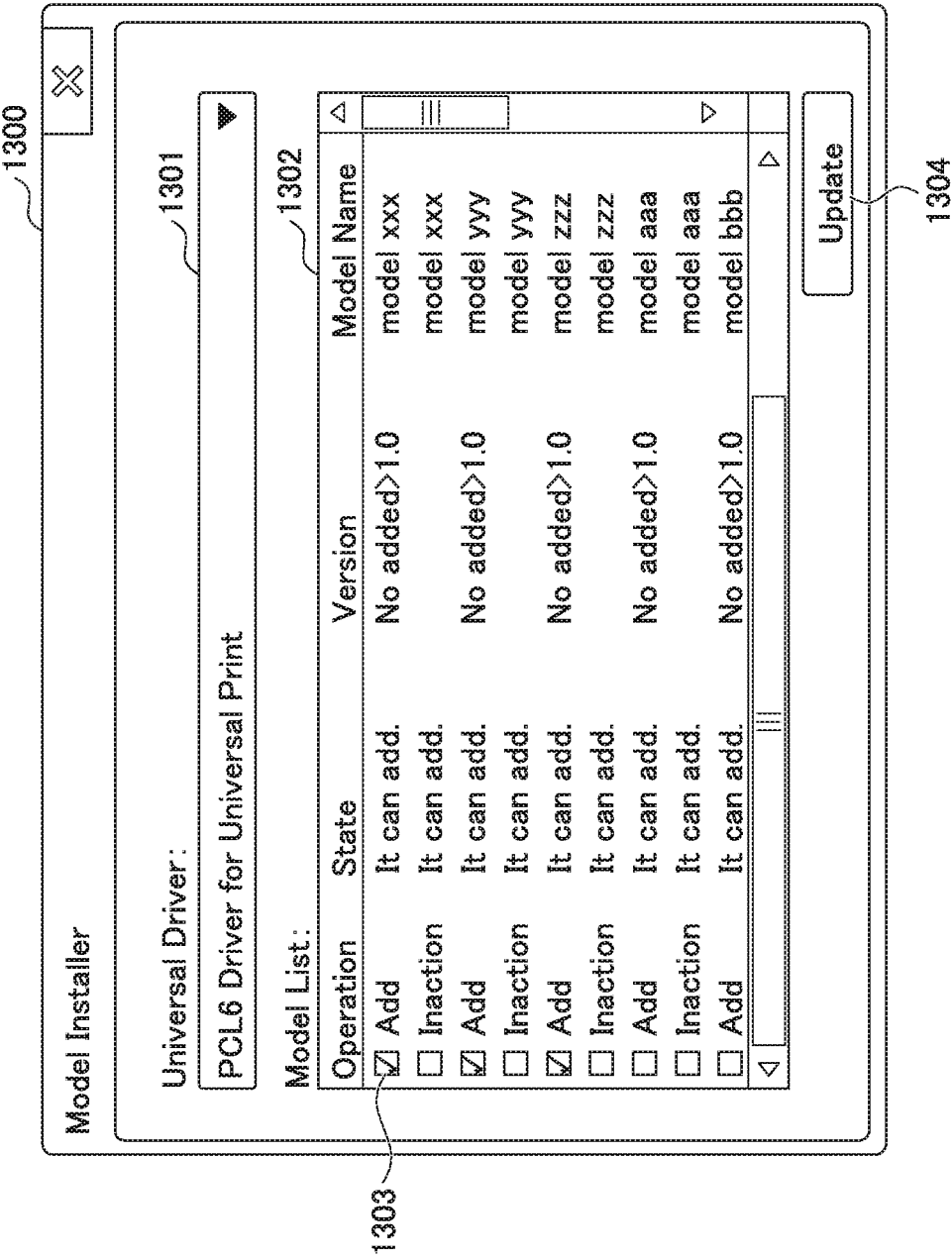
FIG. 13 is a diagram of an example of a display screen of an information addition tool according to the second embodiment.

The model information adder 1204 displays a display screen 1300 of an information addition tool as illustrated in FIG. 13 with the display device 102 of the client device 10. Then, the model information adder 1204 adds information of an additional model selected in the reserved entries 632 of the QueuePropertyBag 420.

FIG. 13 is a diagram of an example of the display screen 1300 of the information addition tool according to the second embodiment.

On the display screen 1300 of the information addition tool illustrated in FIG. 13, e.g., a user uses a pull-down menu 1301 to select the printer driver 303, which is a V4 printer driver common to the models. In addition, the user selects a check box 1303 of a model list 1302, thereby selecting a model to add as an additional model.

Further, when the user selects an "Update" button 1304, the information of the additional model selected is written in the QueuePropertyBag 420 by information writing processing illustrated in FIG. 9, for example. The additional model information includes, e.g., a model list 1201, a model wording 1202, and a model capability 1203.

For example, information of a newly developed additional model (e.g., model A) is added. In this case, the model information adder 1204 adds information such as "finisher Model AAA" and "paper type XXXX" as the model wording 1202. The model information adder 1204 adds information such as "finisher aaa" and "mediatype xxx" as the model capability 1203.

Meanwhile, the printer driver 303 (or the store device application 304) acquires the model wording 1202 and the model capability 1203 from the QueuePropertyBag 420, and merges the model wording 1202 and the model capability 1203 with existing information (e.g., common model information).

Accordingly, e.g., the extension configurator 313 of the printer driver 303 can acquire information such as "finisher aaa" and "mediatype xxx" as the model capability 1203 and information such as "finisher model AAA" and "Paper type XXXX" as the model wording 1202 corresponding to the model capability 1203. In addition, the extension configurator 313 can display the print setting screen (i.e., first print setting screen) for setting print information using the information thus acquired.

FIG. 14A through 14C are diagrams of images of the reserved table 631 and the reserved entries 632 according to the second embodiment.

Specifically, FIG. 14A through 14C illustrate images of the reserved table 631 and the reserved entries 632 after the information of the additional model selected is added through the display screen 1300 of the information addition tool illustrated in FIG. 13, for example.

More specifically, FIG. 14A illustrates an image of the reserved table 631. The reserved table 631 stores an identifier 1411 of predetermined information (i.e., additional information) stored in the reserved entry 632 and information 1412 of the reserved entry 632 storing the predetermined information in association with each other.

In the present example of FIG. 14A, the reserved table 631 stores, e.g., information 1413 on the model list 1201, information 1414 on the model wording 1202, and information 1415 on the model capability 1203. In addition, the reserved table 631 may include information other than the information described above, such as information 1416 on finisher graphics.

The information 1413 stores "extend_model_list", which is an identifier of information for identifying the model list 1201, and information "ReservedEntry001" of the reserved entry 632 storing the model list 1201 in association with each other. The information "ReservedEntry001" of the reserved entry 632 corresponds to, e.g., a name of a registry entry of the QueuePropertyBag 420 as a registry.

Similarly, the information 1414 stores "modelxxx_wording", which is an identifier of information for identifying the model wording 1202, and a registry entry "ReservedEntry005" storing the model wording 1202 in association with each other. Similarly, the information 1415 stores "modelxxx_capability", which is an identifier of information for identifying the model capability 1203, and a registry entry "ReservedEntry010" storing the model capability 1203 in association with each other.

FIG. 14B illustrates an image of the model list 1201 stored in the registry entry "ReservedEntry001". The registry entry "ReservedEntry001" storing the model list 1201 stores a model name 1421 of at least one additional model selected on the display screen 1300 of the information addition tool illustrated in FIG. 13, for example. With this information, the information acquisition unit (the information acquisition unit 601 or the information acquisition unit 602) can acquire a model name of the model added.

FIG. 14C illustrates an image of "modelxxx_wording" as the model wording 1202 corresponding to a model name "modelxxx" stored in the registry entry "ReservedEntry005". For example, the model wording 1202 stores a name 1431 (e.g., "Finisher A") used for definition of the model information and a name 1432 (e.g., "binder") used for display of the UI (e.g., print setting screen) in association with each other.

Note that information may be acquired from a registry entry "ReservedEntry006" corresponding to "modelyyy_wording" to acquire the model wording corresponding to a model name "modelyyy". To acquire the model wording corresponding to an arbitrary model name "VVV", the part corresponding to the model name is changed as "VVV_wording".

Similarly, to acquire the model capability corresponding to an arbitrary model name "WWW", the part corresponding to the model name is changed as "WWW_capability".

FIG. 15 is a diagram of an image of the QueuePropertyBag 420 according to the second embodiment.

Specifically, FIG. 15 illustrates an example of a display screen 1500 when the QueuePropertyBag 420 illustrated in FIG. 12, for example, is displayed with, e.g., a registry editor.

In FIG. 15, a registry entry 1501 stores a name "ReservedEntryMap" representing the reserved table 631 and the reserved table 631 as illustrated in FIG. 14A, for example, as data. A registry entry 1502 stores a reserved entry name "ReservedEntry001" and the model list 1201 illustrated in FIG. 14B, for example, as data.

Similarly, a registry entry 1503 stores a reserved entry name "ReservedEntry 002" and the model wording 1202 illustrated in FIG. 14C, for example, as data. A registry entry 1504 stores a reserved entry name "ReservedEntry003" and the model capability 1203 as data.

Thus, the information addition tool 620 stores, in the QueuePropertyBag 420, information of an additional model selected by, e.g., a user from a model list, for example.

FIG. 15 illustrates an example in which the data type of each registry entry is a character string (REG_SZ). Alternatively, the data type of each registry entry may be in a format other than the character string. Even when the data type of each registry entry is a character string, the character string is not necessarily a plain text that can be recognized by a person. A binary image or the like may be saved as a character string.

<Processing>

Now, a description is given of information processing according to the present embodiment.

Figure 16A:
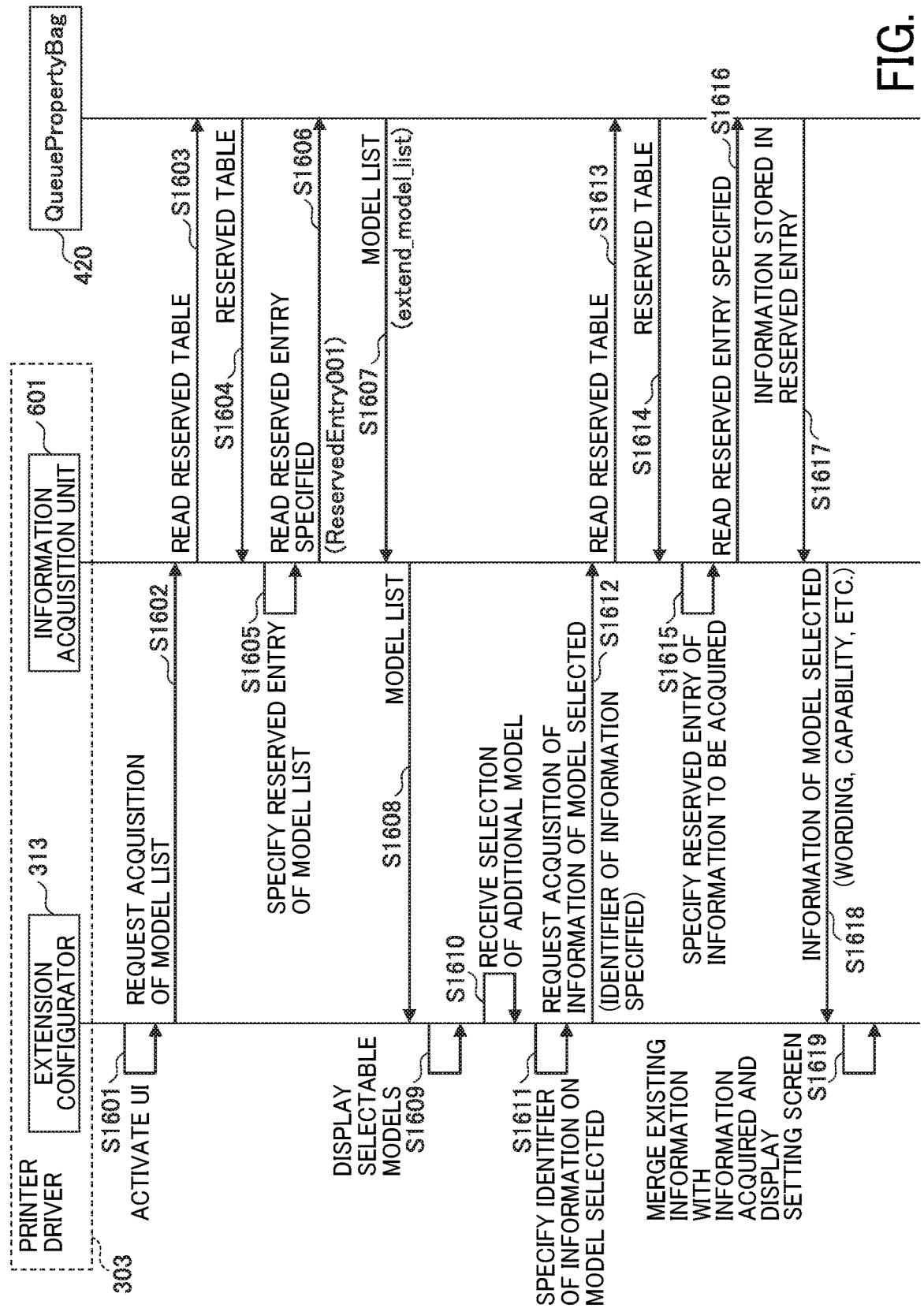
FIG. 16A is a sequence diagram of an example of processing for selecting an additional model according to the second embodiment.

FIG. 16A is a sequence diagram of an example of display processing of the print setting screen according to the second embodiment.

Specifically, FIG. 16A illustrates an example in which the extension configurator 313 of the printer driver 303 displays the UI (i.e., first print setting screen), as an example of processing executed by the information addition tool 620 using the additional model information stored in the QueuePropertyBag 420.

Note that, at the start of the processing illustrated in FIG. 16A, the additional model information described above with reference to FIGS. 13 through 14C is stored in the QueuePropertyBag 420 by the information addition tool 620.

In step S1601, the desktop application 321 activates the UI (i.e., first print setting screen) for print setting of the printer driver 303. Thereafter, the printer driver 303 executes the processing from step S1602 onward.

In step S1602, the extension configurator 313 of the printer driver 303 requests the information acquisition unit 601 to acquire a model list.

In steps S1603 and S1604, the specifier 604A of the information acquisition unit 601 reads the reserved table 631 as illustrated in FIG. 14A, for example, from the QueuePropertyBag 420.

In step S1605, the specifier 604A of the information acquisition unit 601 uses the reserved table 631 thus acquired, thereby specifying a reserved entry of the model list. For example, the specifier 604A specifies the reserved entry "ReservedEntry001" corresponding to the identifier "extend_model_list" of the information corresponding to the model list from the reserved table 631 illustrated in FIG. 14A.

In steps S1606 and S1607, the acquirer 605A of the information acquisition unit 601 reads the reserved entry (e.g., "ReservedEntry001") specified, thereby acquiring the model list as illustrated in FIG. 14B.

In step S1608, the information acquisition unit 601 of the printer driver 303 notifies the extension configurator 313 of the model list thus acquired.

Figure 16B:
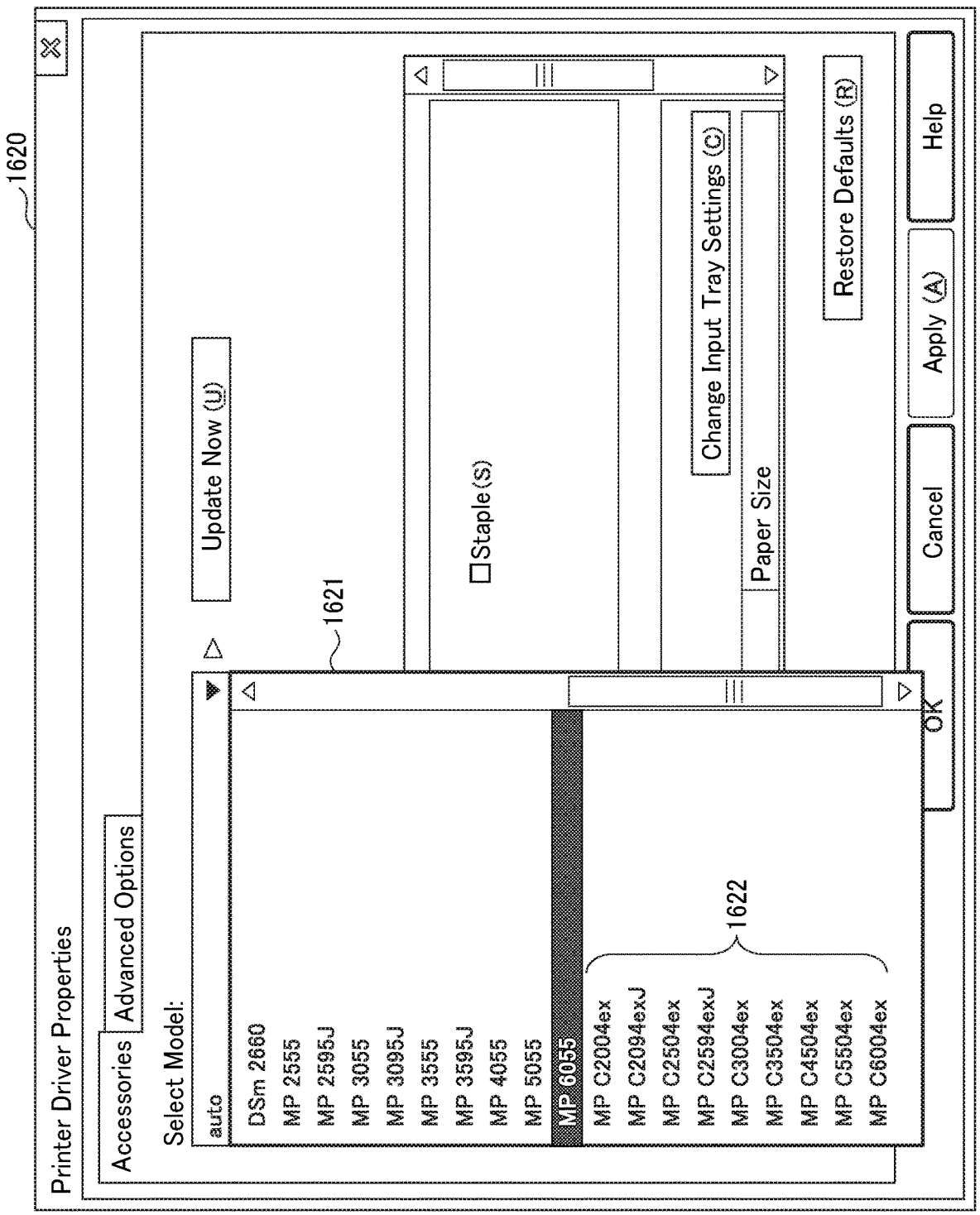
FIG. 16B is a diagram of an example of a display screen for selecting an additional model according to the second embodiment.

In step S1609, the extension configurator 313 of the printer driver 303 displays selectable models on the UI by, e.g., a list display or a pull-down menu. FIG. 16B illustrates an example of such a display screen (i.e., UI) displayed by the extension configurator 313.

FIG. 16B is a diagram of an example of a display screen for selecting an additional model according to the second embodiment.

In the present example of FIG. 16B, a selectable model list 1621 is displayed on a display screen 1620 displayed by the extension configurator 313. The selectable model list 1621 includes additional models 1622 acquired in steps S1602 through S1608, in addition to the models of which information the printer driver 303 has in advance.

In step S1610, the extension configurator 313 of the printer driver 303 receives a selection of an additional model from the selectable models. Thereafter, the printer driver 303 executes the processing from step S1611 onward.

Note that the processing in steps S1609 and S1610 is an example of a model selection performed by the extension configurator 313. For example, the extension configurator 313 may perform bidirectional communication with the image forming apparatus 20 connected to the client device 10, thereby selecting a model of the image forming apparatus 20 connected to the client device 10.

In step S1611, the extension configurator 313 of the printer driver 303 specifies an identifier of information on the model selected.

For example, if "modelxxx" is the model selected in step S1610, and if the model wording 1202 and the model capability 1203 are information to be acquired, then the extension configurator 313 replaces "VVV" of a template "VVV_wording" of an identifier of information corresponding to the model wording with "modelxxx", thereby specifying the identifier of the information corresponding to the model wording as "modelxxx_wording". Similarly, the extension configurator 313 replaces "VVV" of a template "VVV_capability" of an identifier of information corresponding to the model capability with "modelxxx", thereby specifying the identifier of the information corresponding to the model capability as "modelxxx_capability".

In step S1612, the extension configurator 313 of the printer driver 303 requests the information acquisition unit 601 to acquire the information of the model selected. This request includes the identifier of the information specified in step S1611.

In steps S1613 and S1614, the specifier 604A of the information acquisition unit 601 reads the reserved table 631 from the QueuePropertyBag 420.

In step S1615, the specifier 604A of the information acquisition unit 601 uses the reserved table 631 thus acquired, thereby specifying the reserved entry 632 of the information to be acquired (i.e., wording and capability of the model selected).

For example, in the reserved table 631 illustrated in FIG. 14A, the identifier "modelxxx_wording" of the information indicating the wording of the model selected is associated with the reserved entry "ReservedEntry005". The identifier "modelxxx_capability" of the information indicating the capability of the model selected is associated with the reserved entry "ReservedEntry010". Therefore, the specifier 604A specifies that the wording of the model selected (i.e., model wording 1202) is stored in the reserved entry "ReservedEntry005", and that the capability of the model selected (i.e., model capability 1203) is stored in the reserved entry "ReservedEntry010".

In steps S1616 and S1617, the acquirer 605A of the information acquisition unit 601 reads the information from the reserved entry 632 thus specified from the QueuePropertyBag 420, thereby acquiring the information to be acquired.

For example, the acquirer 605A reads the reserved entry "ReservedEntry005", thereby acquiring the wording of the model selected. Similarly, the acquirer 605A reads the reserved entry "ReservedEntry010", thereby acquiring the capability of the model selected.

In step S1618, the information acquisition unit 601 of the printer driver 303 notifies the extension configurator 313 of the information of the model selected (i.e., wording and capability of the model selected).

In step S1619, the extension configurator 313 of the printer driver 303 merges the existing information (i.e., model information common to multiple models) with the information acquired in step S1618, thereby generating model information of the model selected. In addition, the extension configurator 313 uses the model information thus generated, thereby displaying the UI (i.e., first print setting screen).

Note that, in the model capability 1203, e.g., information of available functions in the model added is defined in, e.g., the XML format. In the model wording 1202, e.g., a character string is defined so as to be used to display functions and the like defined in, e.g., the XML format on the UI.

Figure 17:
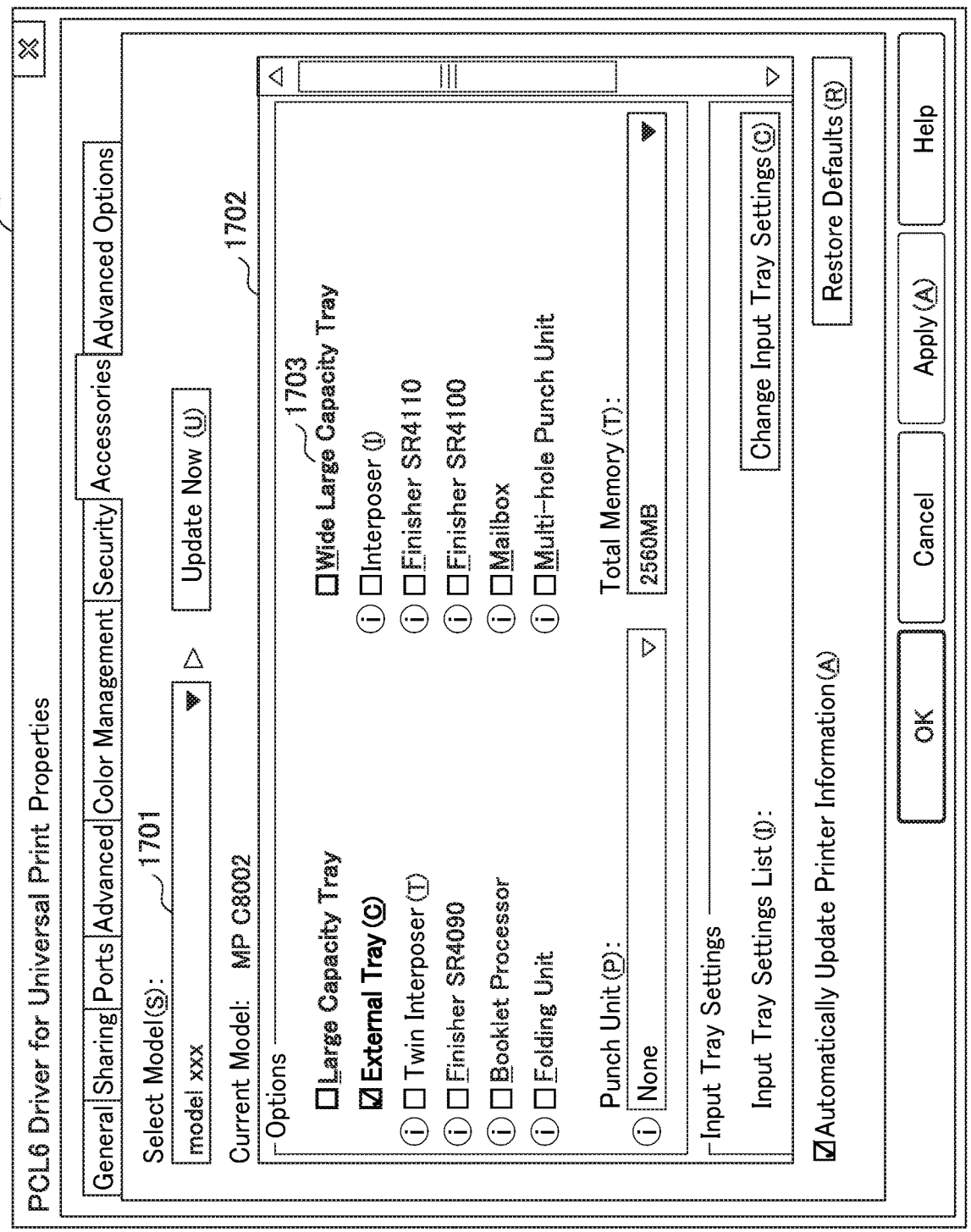
FIG. 17 is a diagram of an example of a print setting screen according to the second embodiment.

FIG. 17 is a diagram of an example of a print setting screen according to the second embodiment.

A print setting screen 1700 illustrated in FIG. 17 includes, e.g., an option selection screen 1702 that displays options available in "modelxxx", which is a selected model 1701.

For example, the "modelxxx", which is an additional model added by the information addition tool 620, has an option "Wide Large Capacity Tray" 1703 which existing models do not have. In this case, the extension configurator 313 uses the information of wording and capability of the "modelxxx" acquired in step S1618 to display the new option "Wide Large Capacity Tray" 1703 on the option selection screen 1702.

Similarly, when the UI is activated, the print configurator 603 of the store device application 304 acquires the additional model information stored in the QueuePropertyBag 420 with the information acquisition unit 602 to display the UI (i.e., second print setting screen).

Thus, according to the present embodiment, an available model can be added by adding the information on new models of the image forming apparatuses 20 to the client device 10 that executes the V4 printer driver common to the models.

Note that the additional model information stored in the QueuePropertyBag 420 is available not only from the extension configurator 313, but also from the configuration controller 323 and the renderer 333 of the printer driver 303.

Figure 18:
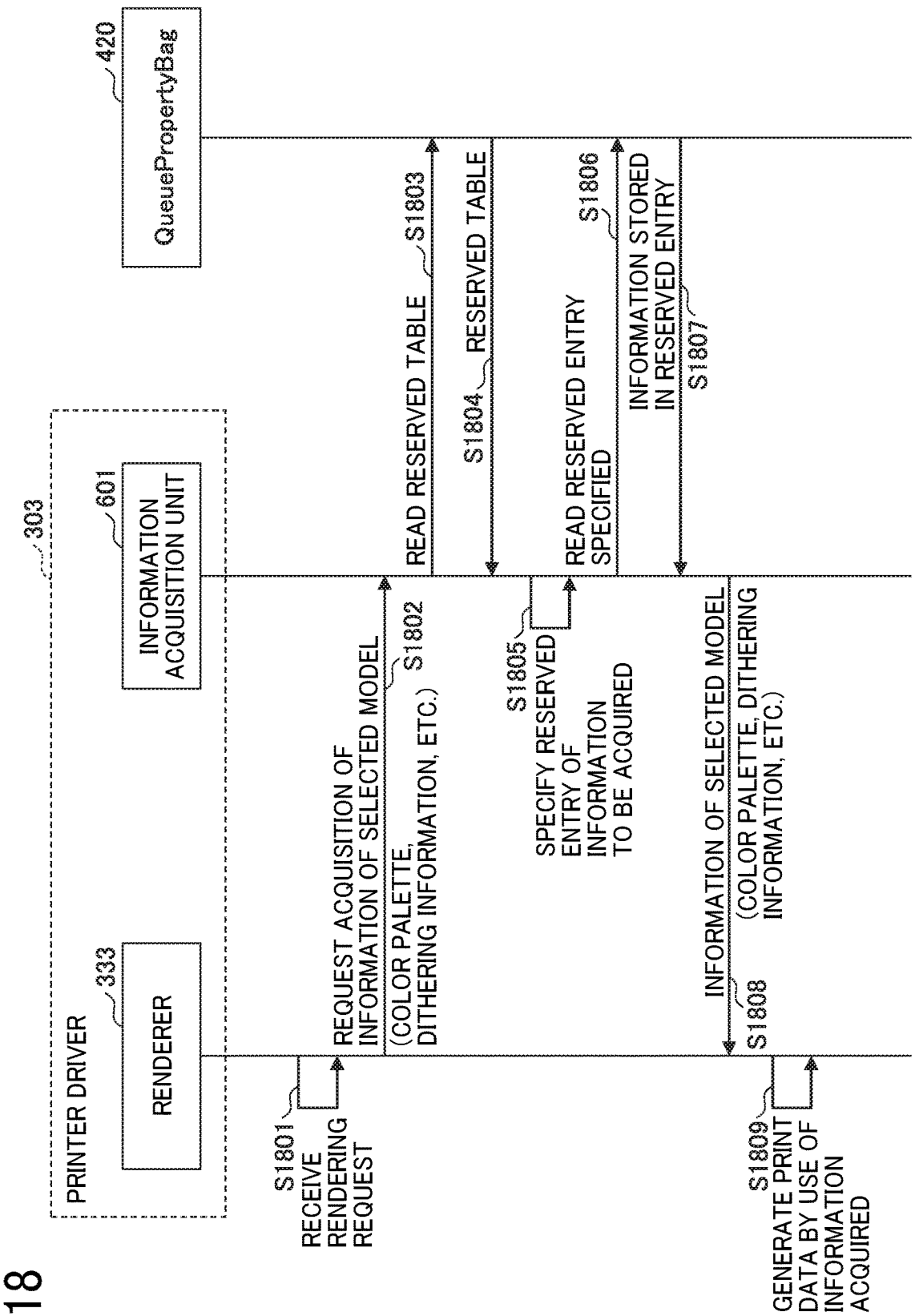
FIG. 18 is a sequence diagram of an example of rendering processing according to the second embodiment.

FIG. 18 is a sequence diagram of an example of rendering processing according to the second embodiment.

Specifically, FIG. 18 illustrates an example in which the renderer 333 of the printer driver 303 uses the additional model information stored in the QueuePropertyBag 420, thereby generating print data. Note that, in the present example, the QueuePropertyBag 420 stores the additional model information (e.g., color palette, dithering information) that is used by the renderer 333 for generating print data.

The dithering information is, e.g., information that is used for dithering to express, with a limited number of colors, color tones greater than the limited number of colors. The color palette is color value information that is used for color printing. The dither information and the color palette are examples of the additional model information that includes information peculiar to each model, for example.

Note that, in the present example, an additional model of which information is stored in the QueuePropertyBag 420 is selected by the processing of steps S1601 through S1610 of FIG. 16A. Since the basic processing is similar to the information acquisition processing according to the first embodiment illustrated in FIG. 11, a detailed description thereof is herein omitted.

In step S1801, the printer driver 303 receives a rendering request from, e.g., the application 301 via the OS 302. Thereafter, the printer driver 303 executes the processing from step S1802 onward.

In step S1802, the renderer 333 of the printer driver 303 requests acquisition of, e.g., a color palette and dither information of the selected model.

In steps S1803 and S1804, in response to the request from the renderer 333 to acquire the information, the information acquisition unit 601 of the printer driver 303 reads the reserved table 631 from the QueuePropertyBag 420.

In step S1805, the information acquisition unit 601 uses the reserved table 631 thus acquired, thereby specifying the reserved entry 632 of the color palette, the dither information, and the like.

In steps S1806 and S1807, the information acquisition unit 601 reads the reserved entry 632 thus specified, thereby acquiring the color palette, the dither information, and the like of the selected model.

In step S1808, the information acquisition unit 601 of the printer driver 303 notifies the renderer 333 of the color palette, the dither information, and the like thus acquired.

In step S1809, the renderer 333 of the printer driver 303 uses the information thus acquired, such as the color palette and the dither information, thereby generating print data.

Thus, the renderer 333 of the printer driver 303 uses the additional model information stored in the QueuePropertyBag 420 to generate print data.

Following the procedure described above, the configuration controller 323 of the printer driver 303 can acquire the additional model information stored in the QueuePropertyBag 420. Accordingly, the configuration controller 323 can generate print setting information such as PrintTicket and PrintCapability using the additional model information stored in the QueuePropertyBag 420.

Note that, in the first and second embodiments described above, the client device 10 serves as an information processing apparatus. Alternatively, the information processing apparatus may be the server device 30 in which the printer driver 303 is installed.

[Third Embodiment]

Now, a description is given of a third embodiment. Specifically, a description is given of, e.g., display processing of a print setting screen, saving processing of setting values, print processing, and capability information generation processing, including processing executed by the configuration controller 323.

Note that the client device 10 of the third embodiment has a functional configuration similar to the functional configuration of the client device 10 of the second embodiment illustrated in FIG. 12. Like the first and second embodiments described above, the printer driver 303 of the third embodiment may include a single information acquisition unit 601, or each of the extension configurator 313, the configuration controller 323, and the renderer 333 may include the information acquisition unit 601. Specifically, the extension configurator 313, the configuration controller 323, and the renderer 333 may include the first information acquisition unit 601-1, the second information acquisition unit 601-2, and the third information acquisition unit 601-3, respectively, as illustrated in FIG. 6B.

(Configuration Controller)

Before describing processing according to the third embodiment, a description is now given of the configuration controller 323.

The configuration controller 323 serving as a prohibition script mainly has the following three functions.

The first function is to mutually convert setting information in a Devmode format and setting information in a PrintTicket format.

The print setting information of the printer driver 303 includes the setting information in the PrintTicket format (hereinafter referred to as PrintTicket) and the setting information in the Devmode format (hereinafter referred to as DevMode). The PrintTicket is setting information expressed in the XML format and described as a character string, for example. On the other hand, the DevMode is setting information in a binary format. The DevMode is stored and managed by the OS 302 in the DEVMODE structure.

The printer driver 303 performs various types of processing using the PrintTicket basically. However, printing is set with the DevMode or the PrintTicket depending on the application 301. Therefore, the printer driver 303 has a function of converting setting information from the DevMode to the PrintTicket or from the PrintTicket to the DevMode with the configuration controller 323.

For example, in response to a request from, e.g., the application 301 or the OS 302, the configuration controller 323 acquires a setting value in the Devmode format from the DevmodePropertyBag, and converts the setting value thus acquired into the PrintTicket. Then, the configuration controller 323 returns the setting value in the PrintTicket format.

On the other hand, in response to a request from, e.g., the application 301 or the OS 302, the configuration controller 323 converts the PrintTicket into the DevMode and stores the DevMode in the DevmodePropertyBag. The OS 302 reflects the setting information stored in the DevmodePropertyBag into the DEVMODE structure.

The second function of the configuration controller 323 is to generate capability information (i.e., PrintCapabilities) of the printer driver 303. In response to a request from, e.g., the application 301 or the OS 302, the configuration controller 323 generates capability information (hereinafter referred to as PrintCapabilities) on a function settable for printing, that is, capability information indicating information of a function that can be set by the printer driver 303.

The third function of the configuration controller 323 is to control prohibition setting of print setting.

For example, if the PrintTicket includes setting values in an exclusive relationship that cannot be set at the same time, then the configuration controller 323 changes the setting values so as to eliminate the exclusive relationship. For example, if a paper size "B5" and an input tray "tray 2" are set in the PrintTicket while the paper size of the tray 2 is "A4", then the configuration controller 323 changes the setting value to a default setting value (e.g., "automatic selection") included in the capability information.

The configuration controller 323 executes a script (i.e., prohibition script) for controlling print setting information, thereby implementing the three functions described above.

<Processing>

Now, a description is given of the processing according to the third embodiment. Note that, a detailed description is herein omitted of processing similar to the processing according to the second embodiment. The following description concentrates on differences in the processing between the second embodiment and the third embodiment.

(Print Setting Processing)

Figure 19:
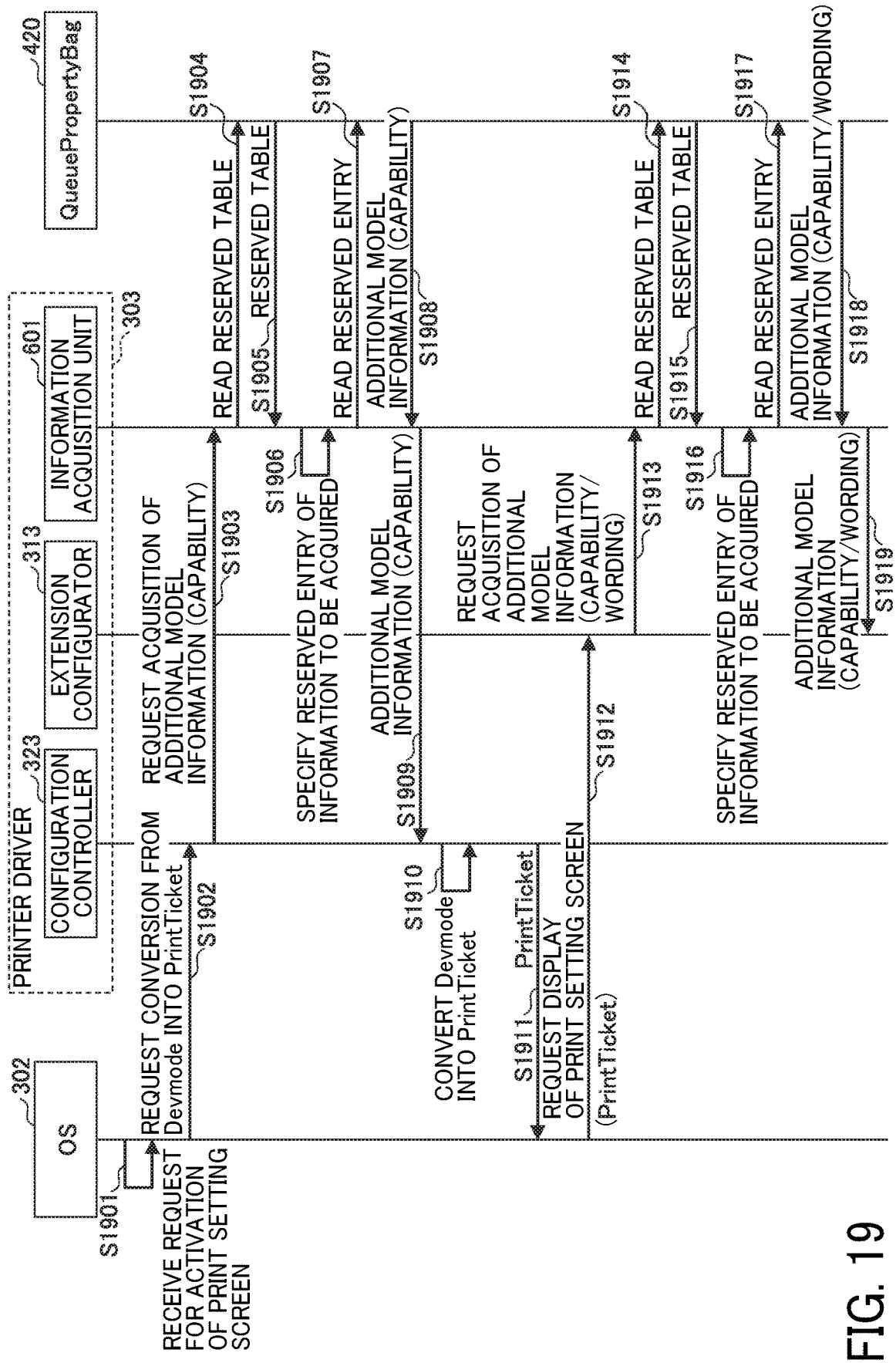
FIG. 19 is a sequence diagram of an example of print setting processing according to a third embodiment.

Initially, with reference to FIG. 19, a description is given of print setting.

FIG. 19 is a sequence diagram of an example of print setting processing according to the third embodiment.

Specifically, FIG. 19 illustrates an example in which the printer driver 303 displays a print setting screen in response to a request from, e.g., the application 301, and stores setting information set by, e.g., a user. Note that, at the start of the processing illustrated in FIG. 19, an additional model added by the information addition tool 620 is selected by the processing illustrated in FIG. 16A, for example.

In step S1901, the OS 302 receives, a request for activation of the print setting screen from the desktop application 321, for example.

In response to the request for activation of the print setting screen, in step S1902, the OS 302 requests the configuration controller 323 of the printer driver 303 to convert the setting information in the Devmode format into the setting information in the PrintTicket format. For example, the OS 302 uses an Application Programming Interface (API), such as convertDevModeToPrintTicket, prepared in advance, thereby requesting the printer driver 303 to convert the DevMode into the PrintTicket.

As described above, since an additional model added by the information addition tool 620 is selected, the printer driver 303 executes the processing of steps S1903 through S1909, thereby acquiring information of the additional model (i.e., additional model information).

In step S1903, the configuration controller 323 requests the information acquisition unit 601 to acquire the additional model information, such as the model capability 1203, stored in the QueuePropertyBag 420.

Note that, if the extension configurator 313, the configuration controller 323, and the renderer 333 include the first information acquisition unit 601-1, the second information acquisition unit 601-2, and the third information acquisition unit 601-3, respectively, as illustrated in FIG. 6B, then the information acquisition unit included in the request source executes the processing of the information acquisition unit 601 illustrated in FIG. 19. For example, if the request source is the configuration controller 323, then the second information acquisition unit 601-2 executes the processing of the information acquisition unit 601 illustrated in FIG. 19. Alternatively, if the request source is the extension configurator 313, then the first information acquisition unit 601-1 executes the processing of the information acquisition unit 601 illustrated in FIG. 19.

In steps S1904 and S1905, the specifier 604A of the information acquisition unit 601 reads the reserved table 631 from the QueuePropertyBag 420 corresponding to the logical printer of the printer driver 303.

In step S1906, the specifier 604A of the information acquisition unit 601 uses the reserved table 631 thus acquired, thereby specifying the reserved entry 632 of information to be acquired (e.g., model capability 1203).

In steps S1907 and S1908, the acquirer 605A of the information acquisition unit 601 reads the reserved entry 632 specified by the specifier 604A, thereby acquiring the information such as the model capability 1203.

In step S1909, the information acquisition unit 601 notifies the configuration controller 323 of the information such as the model capability 1203 thus acquired.

In step S1910, the configuration controller 323 uses the information such as the model capability 1203 acquired in steps S1903 through S1909, thereby converting the DevMode into the PrintTicket, thus generating the PrintTicket.

Note that the model capability 1203 thus acquired includes, e.g., capability information of a model added (hereinafter referred to as model capability information) and conversion information (hereinafter referred to as a conversion table) that is used for conversion between the DevMode (i.e., print setting information in the DevMode format) and the PrintTicket (i.e., print setting information in the PrintTicket format) according to the capability information.

Referring now to FIGS. 21A and 21B, a description is given of the model capability information and the conversion table. The model capability information and the conversion table are used when the configuration controller 323 converts the DevMode into the PrintTicket, for example.

FIG. 21A is a diagram of an example of the model capability information according to the third embodiment.

In the present example of FIG. 21A, model capability information 2110 is described in the XML format. The model capability information 2110 includes a definition 2111 of an "orientation" function and a definition 2112 of a "layout" function owned by the model added (i.e., additional model). Note that the "orientation" function and the "layout" function are examples of unique functions owned by the additional model.

In the definition 2111 of the "orientation" function, a description of ""feature" name="orientation"" indicates that the description is related to the "orientation" function. A description of "type="pickone"" indicates that the setting value is chosen from options. Descriptions of "pickone name="portrait"" and "pickone name="landscape"" define that the options are "portrait" and "landscape".

Preferably, in the definition 2111 of the "orientation" function, a description of "default="portrait"" defines that a default value 2113 of the "orientation" function is "portrait". Accordingly, if the setting value is inconsistent, for example, if a setting value not defined in the definition 2111 of the "orientation" function is specified as a designated setting value, then the configuration controller 323 changes the setting value to the default value 2113, thereby addressing the inconsistency.

On the other hand, the definition 2112 of the "layout" function includes a description 2115 of "constraints "booklet !=off"" indicating that "booklet cannot be set except off". Accordingly, for example, when a setting of "booklet=on" is included in the designated setting value, the configuration controller 323 can set the setting value to a default value 2114 of the "layout" function. As another example, if the designated setting value is inconsistent, then the configuration controller 323 may delete the setting value to address the inconsistency.

Thus, the model capability information 2110 includes, e.g., the capability of a model added (e.g., presence or absence of functions, options), default values, and information used for prohibition processing (i.e., exclusion processing), and the like. Note that the model capability information 2110 illustrated in FIG. 21A is an example. The model capability information may be in a different format from the format illustrated in FIG. 21A. In addition, the model capability information may include different items from the items illustrated in FIG. 21A.

FIG. 21B is a diagram of an example of the conversion table according to the third embodiment.

FIG. 21B illustrates a conversion table 2120 described in a JavaScript Object Notation (JSON) format. Note that the JSON is a data description language based on object notation in JavaScript (registered trademark). Alternatively, the conversion table 2120 may be described in a format different from the JSON format.

As illustrated in FIG. 21B, the conversion table 2120 stores a "pt_name" 2121 indicating a name in the PrintTicket of wording included in the setting information and a "dm_name" 2122 indicating a name in the DevMode of the wording included in the setting information. The configuration controller 323 uses the conversion table 2120 to mutually convert each wording between the PrintTicket and the DevMode. Note that the conversion table 2120 is an exemplary method used for mutual conversion between the PrintTicket and the DevMode. The configuration controller 323 may perform mutual conversion in a different method from the conversion table 2120.

Referring back to FIG. 19, in step S1910, the configuration controller 323 uses, e.g., the model capability information 2110 and the conversion table 2120, thereby converting the DevMode into the PrintTicket, thus generating the PrintTicket.

In step S1911, the configuration controller 323 notifies the OS 302 of the PrintTicket thus generated.

In step S1912, the OS 302 requests the extension configurator 313 of the printer driver 303 to display the print setting screen. Note that, in step S1901, if the store application 311 is the request source that requests to activate the print setting screen, then the OS 302 requests the store device application 304, instead of the extension configurator 313, to display the print setting screen.

In step S1913, the extension configurator 313 requests the information acquisition unit 601 to acquire, e.g., the model capability 1203 and the model wording 1202 stored in the QueuePropertyBag 420.

In steps S1914 and S1915, the specifier 604A of the information acquisition unit 601 reads the reserved table 631 from the QueuePropertyBag 420 corresponding to the logical printer of the printer driver 303.

In step S1916, the specifier 604A of the information acquisition unit 601 uses the reserved table 631 thus acquired, thereby specifying the reserved entry 632 of the information to be acquired (e.g., model capability 1203, model wording 1202).

In steps S1917 and S1918, the acquirer 605A of the information acquisition unit 601 reads the reserved entry 632 specified by the specifier 604A, thereby acquiring, e.g., the model capability 1203 and the model wording 1202.

In step S1919, the information acquisition unit 601 notifies the extension configurator 313 of, e.g., the model capability 1203 and the model wording 1202 thus acquired.

Figure 20:
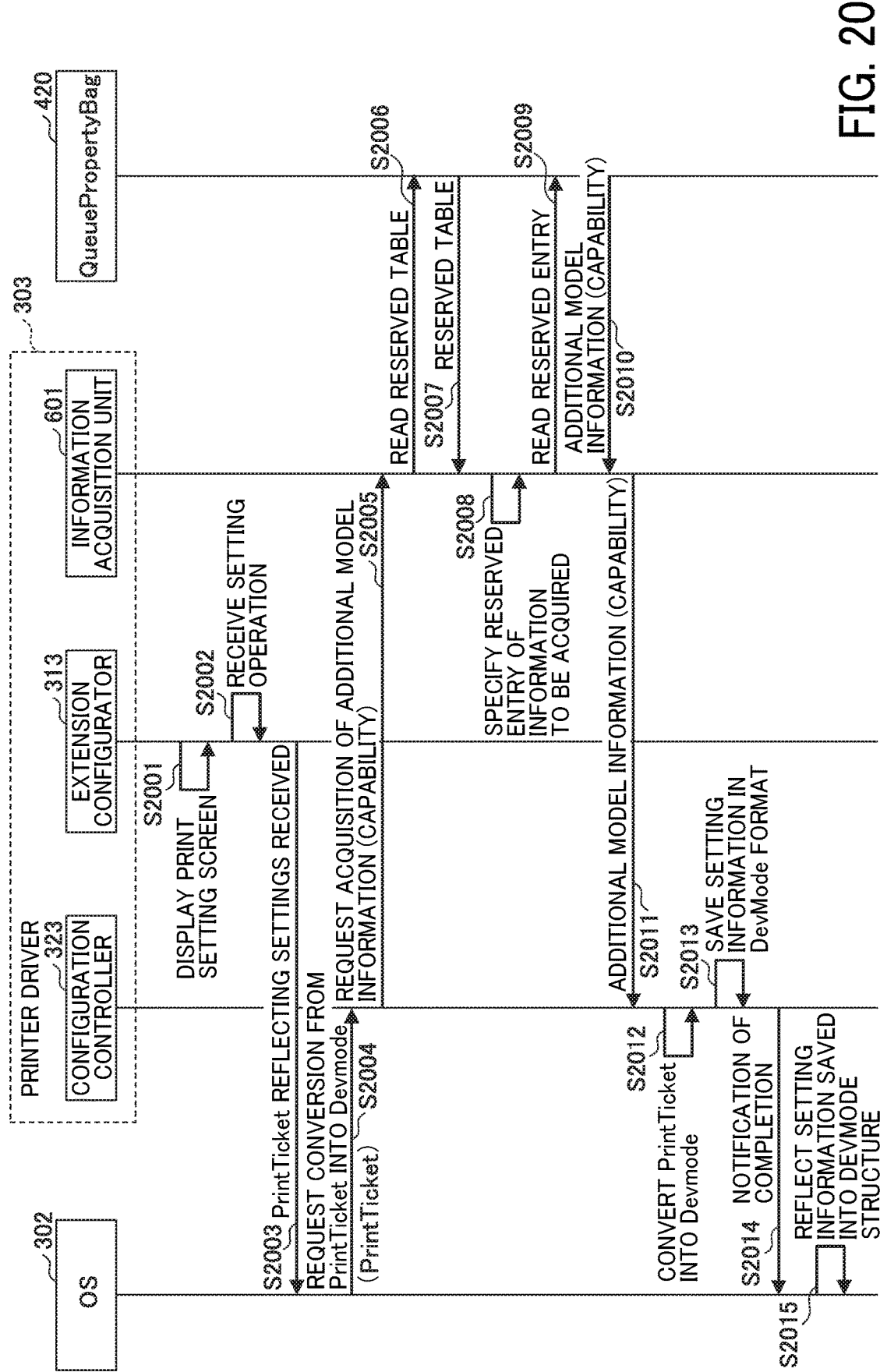
FIG. 20 is a sequence diagram of a continued example of the print setting processing of FIG. 19.

FIG. 20 is a sequence diagram of a continued example of the print setting processing of FIG. 19.

In step S2001 in FIG. 20, the extension configurator 313 of the printer driver 303 uses, e.g., the model capability 1203 and the model wording 1202 thus notified, thereby displaying the print setting screen for setting print setting information with, e.g., the display device 102.

Figure 22A:
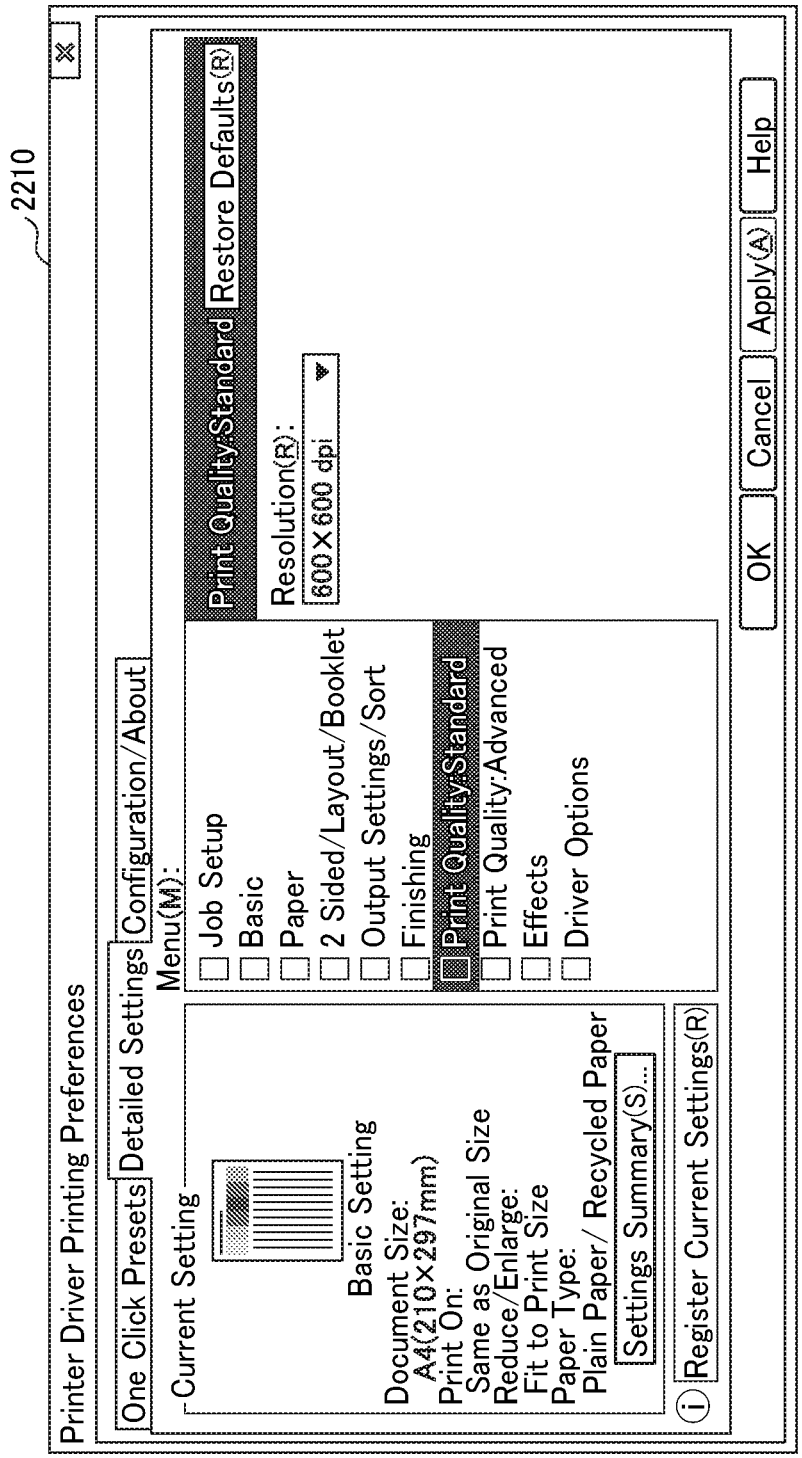
FIG. 22A is a diagram of a default print setting screen according to the third embodiment.
Figure 22B:
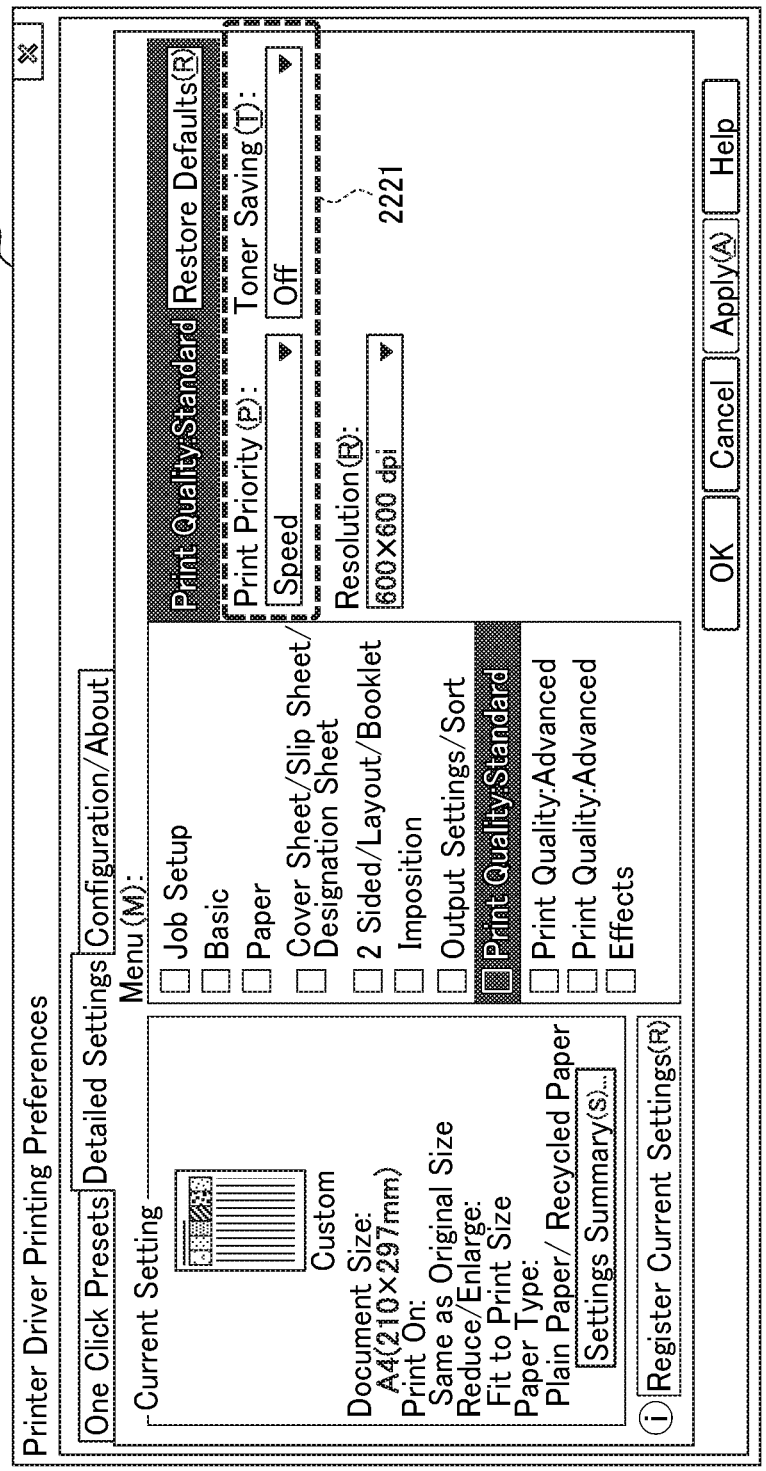
FIG. 22B is a diagram of a print setting screen including a setting item related to a model added.

FIG. 22A and 22B illustrate examples of the print setting screen according to the third embodiment.

Specifically, FIG. 22A is a diagram of a default print setting screen 2210. FIG. 22B is a diagram of a print setting screen 2220 including a setting item 2221 related to the model added.

In the present embodiment, the extension configurator 313 receives print setting inputted by, e.g., a user through the print setting screen 2220 displayed, including the setting item 2221 related to the model added.

Referring back to FIG. 20, in step S2002, the extension configurator 313 receives a setting operation performed by, e.g., a user. Specifically, the extension configurator 313 receives user settings through the print setting screen 2220 as illustrated in FIG. 22B, for example.

In step S2003, the extension configurator 313 notifies the OS 302 of the PrintTicket reflecting the user settings thus received.

In step S2004, the OS 302 requests the configuration controller 323 of the printer driver 303 to convert the PrintTicket into the DevMode in order to store (or save) the settings of the PrintTicket thus notified. For example, the OS 302 uses the API (e.g., convertDevModeToPrintTicket) prepared in advance, thereby requesting the printer driver 303 to convert the PrintTicket into the DevMode.

In step S2005, the configuration controller 323 requests the information acquisition unit 601 to acquire, e.g., the model capability 1203 stored in the QueuePropertyBag 420.

Note that, if the extension configurator 313, the configuration controller 323, and the renderer 333 include the first information acquisition unit 601-1, the second information acquisition unit 601-2, and the third information acquisition unit 601-3, respectively, as illustrated in FIG. 6B, then the information acquisition unit included in the request source executes the processing of the information acquisition unit 601 illustrated in FIG. 20. For example, if the request source is the configuration controller 323, then the second information acquisition unit 601-2 executes the processing of the information acquisition unit 601 illustrated in FIG. 20.

In steps S2006 and S2007, the specifier 604A of the information acquisition unit 601 reads the reserved table 631 from the QueuePropertyBag 420 corresponding to the logical printer of the printer driver 303.

In step S2008, the specifier 604A of the information acquisition unit 601 uses the reserved table 631 thus acquired, thereby specifying the reserved entry 632 of information to be acquired (e.g., model capability 1203).

In steps S2009 and S2010, the acquirer 605A of the information acquisition unit 601 reads the reserved entry 632 specified by the specifier 604A, thereby acquiring the information such as the model capability 1203.

In step S2011, the information acquisition unit 601 notifies the configuration controller 323 of the information such as the model capability 1203 thus acquired.

In step S2012, the configuration controller 323 uses the model capability information 2110 and the conversion table 2120 included in the model capability 1203 thus notified, thereby converting the PrintTicket into the DevMode, thus generating the DevMode. Like the conversion from the DevMode into the PrintTicket in step S1910 described above with reference to FIG. 19, the configuration controller 323 converts the PrintTicket into the DevMode.

In step S2013, the configuration controller 323 stores (or saves) the DevMode (i.e., setting information in the Devmode format) thus generated in the DevmodePropertyBag.

In step S2014, the configuration controller 323 sends a notification of completion to the OS 302.

In step S2015, the OS 302 reflects the setting information stored or saved in the DevmodePropertyBag into the DEVMODE structure.

Through the processing described above, the client device 10 displays the print setting screen related to the model added with the display device 102 to receive changes to the print setting inputted by the user, and saves the print setting changed.

(Print Processing)

Figure 23:
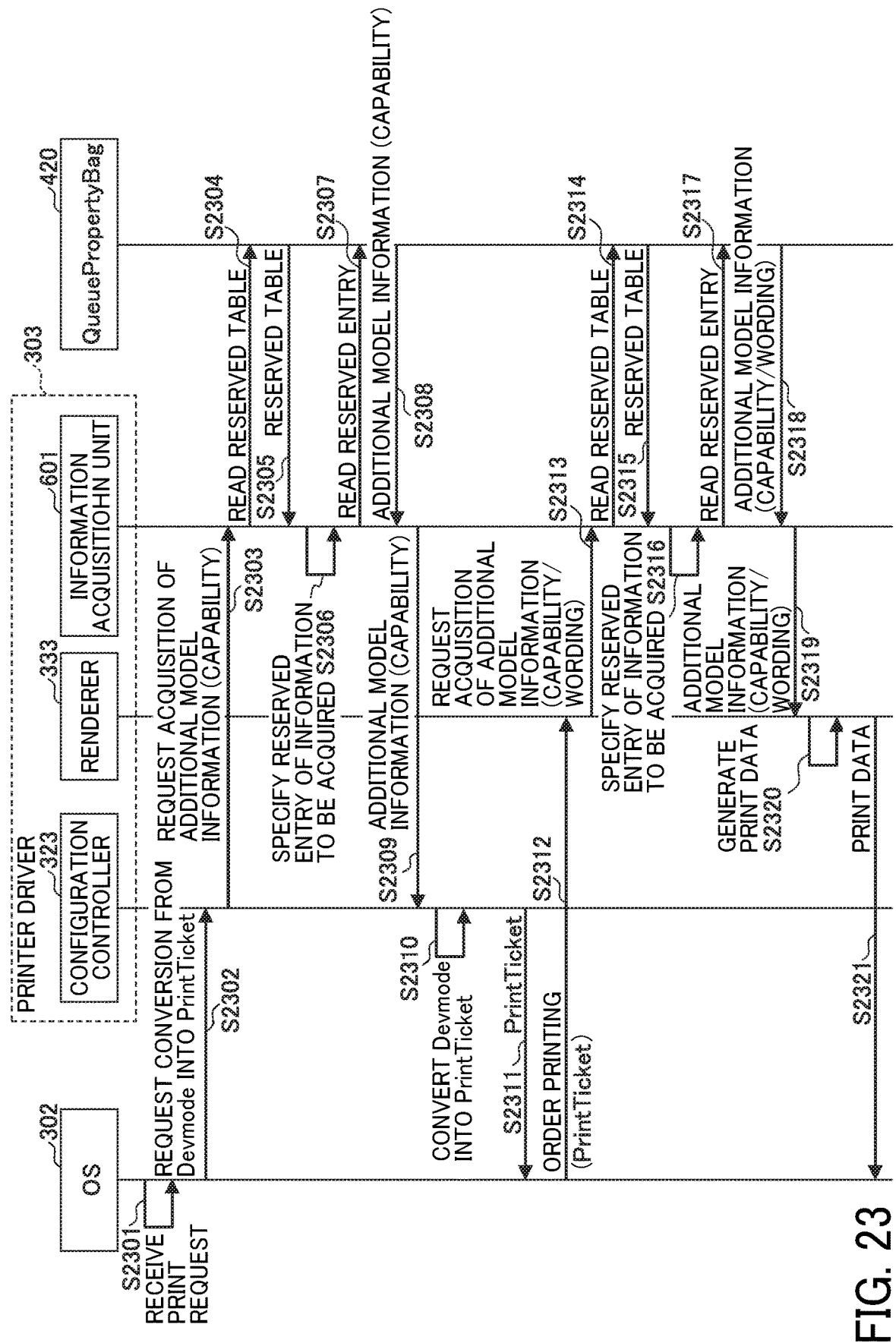
FIG. 23 is a sequence diagram of an example of print processing according to the third embodiment.

Referring now to FIG. 23, a description is given of print processing according to the third embodiment.

FIG. 23 is a sequence diagram of an example of the print processing according to the third embodiment.

Specifically, FIG. 23 illustrates an example in which printing is executed with the print setting information of the model added that is set in the print setting processing illustrated in FIGS. 19 and 20.

Note that, at the start of the processing illustrated in FIG. 23, an additional model added by the information addition tool 620 is selected by the processing of selecting an additional model illustrated in FIG. 16A, for example. In addition, the print setting information of the model added is set by the print setting processing illustrated in FIGS. 19 and 20, for example.

In step S2301, the OS 302 receives a print request from, e.g., the desktop application 321.

In response to the print request, in step S2302, the OS 302 requests the configuration controller 323 of the printer driver 303 to convert the setting information in the Devmode format into the setting information in the PrintTicket format.

Note that, if the extension configurator 313, the configuration controller 323, and the renderer 333 include the first information acquisition unit 601-1, the second information acquisition unit 601-2, and the third information acquisition unit 601-3, respectively, as illustrated in FIG. 6B, then the information acquisition unit included in the request source executes the processing of the information acquisition unit 601 illustrated in FIG. 23. For example, if the request source is the configuration controller 323, then the second information acquisition unit 601-2 executes the processing of the information acquisition unit 601 illustrated in FIG. 23. Alternatively, if the request source is the renderer 333, then the third information acquisition unit 601-3 executes the processing of the information acquisition unit 601 illustrated in FIG. 23.

In step S2303, the configuration controller 323 requests the information acquisition unit 601 to acquire, e.g., the model capability 1203 stored in the QueuePropertyBag 420.

In steps S2304 and S2305, the specifier 604A of the information acquisition unit 601 reads the reserved table 631 from the QueuePropertyBag 420 corresponding to the logical printer of the printer driver 303.

In step S2306, the specifier 604A of the information acquisition unit 601 uses the reserved table 631 thus acquired, thereby specifying the reserved entry 632 of information to be acquired (e.g., model capability 1203).

In steps S2307 and S2308, the acquirer 605A of the information acquisition unit 601 reads the reserved entry 632 specified by the specifier 604A, thereby acquiring the information such as the model capability 1203.

In step S2309, the information acquisition unit 601 notifies the configuration controller 323 of the information such as the model capability 1203 thus acquired. The model capability 1203 includes information such as the model capability information 2110 and the conversion table 2120 described above with reference to FIGS. 21A and 21B.

In step S2310, the configuration controller 323 uses the information such as the model capability 1203 acquired in steps S2303 through S2309, thereby converting the DevMode into the PrintTicket, thus generating the PrintTicket.

The configuration controller 323 may not know how to convert the DevMode into the PrintTicket without the information of the model added. To prevent such a situation, the configuration controller 323 acquires the model capability information 2110 and the conversion table 2120 by the processing in steps S2303 through S2309. For example, the configuration controller 323 reads a setting value in the DevMode format from DevmodePropertyBag corresponding to the logical printer of the printer driver 303. Then, the configuration controller 323 uses the model capability information 2110 and the conversion table 2120, thereby converting the setting value in the Devmode format into a setting value in the PrintTicket format.

In step S2311, the configuration controller 323 notifies the OS 302 of the PrintTicket thus generated.

In step S2312, the OS 302 orders printing with a print command to the renderer 333 of the printer driver 303. The print command includes the PrintTicket notified in step S2311.

In step S2313, the renderer 333 of the printer driver 303 requests the information acquisition unit 601 to acquire, e.g., the model capability 1203 and the model wording 1202 stored in the QueuePropertyBag 420.

In steps S2314 and S2315, the specifier 604A of the information acquisition unit 601 reads the reserved table 631 from the QueuePropertyBag 420 corresponding to the logical printer of the printer driver 303.

In step S2316, the specifier 604A of the information acquisition unit 601 uses the reserved table 631 thus acquired, thereby specifying the reserved entry 632 of information to be acquired (e.g., model capability 1203, model wording 1202).

In steps S2317 and S2318, the acquirer 605A of the information acquisition unit 601 reads the reserved entry 632 specified by the specifier 604A, thereby acquiring, e.g., the model capability 1203 and the model wording 1202.

In step S2319, the information acquisition unit 601 notifies the renderer 333 of, e.g., the model capability 1203 and the model wording 1202 thus acquired.

In step S2320, the renderer 333 of the printer driver 303 uses the PrintTicket included in the print command and the information acquired, such as the model capability 1203 and the model wording 1202, thereby generating print data. At this time, the renderer 333 uses the model capability 1203 and the model wording 1202 acquired in the steps S2313 through S2319 to use, e.g., a command peculiar to the model added.

In step S2321, the renderer 333 transmits the print data generated to the image forming apparatus 20 via, e.g., the OS 302, thereby executing printing.

Through the processing described above, the client device 10 executes print processing with the command peculiar to the model added.

(Capability Information Generation Processing)

The embodiments of the present disclosure can be applied when the configuration controller 323 generates capability information (e.g., PrintCapabilities) of the printer driver 303.

Figure 24:
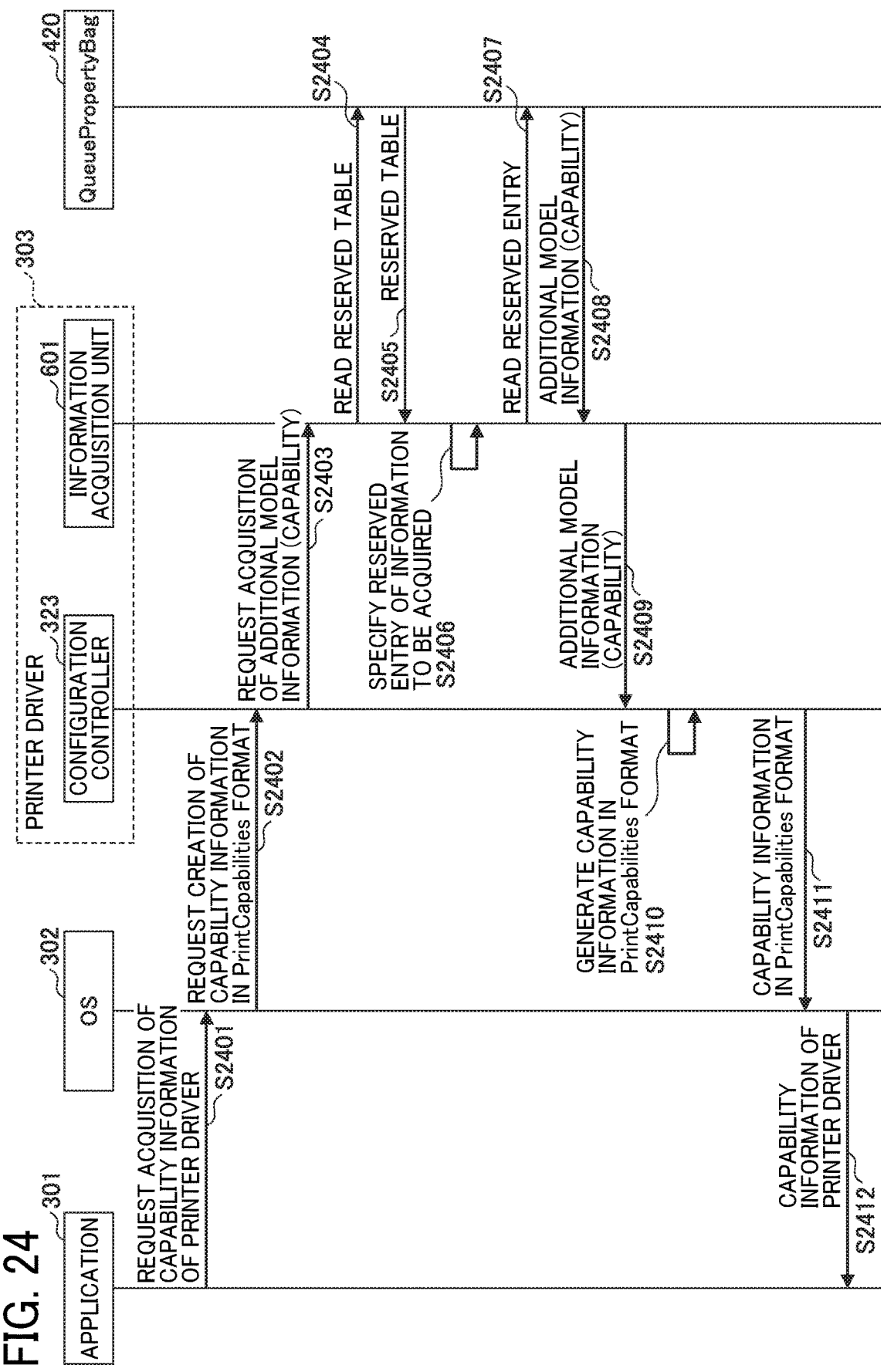
FIG. 24 is a sequence diagram of an example of capability information generation processing according to the third embodiment.

FIG. 24 is a sequence diagram of an example of capability information generation processing according to the third embodiment.

For example, when the application 301 requests the setting information of the printer driver 303 from the OS 302, the OS 302 requests the configuration controller 323 to create (or acquire) setting information in a Print Capabilities format. In addition, upon activation of the print setting screen and upon printing, the OS 302 requests the configuration controller 323 to create the setting information in the Print Capabilities format. In such a case, the capability information is generated as illustrated in FIG. 24.

In step S2401, the application 301 requests the OS 302 to acquire the capability information of the printer driver 303.

In step S2402, the OS 302 requests the configuration controller 323 to create the capability information in the Print Capabilities format.

In step S2403, the configuration controller 323 requests the information acquisition unit 601 to acquire, e.g., the model capability 1203 stored in the QueuePropertyBag 420.

Note that, if the extension configurator 313, the configuration controller 323, and the renderer 333 include the first information acquisition unit 601-1, the second information acquisition unit 601-2, and the third information acquisition unit 601-3, respectively, as illustrated in FIG. 6B, then the information acquisition unit included in the request source executes the processing of the information acquisition unit 601 illustrated in FIG. 24. For example, if the request source is the configuration controller 323, then the second information acquisition unit 601-2 executes the processing of the information acquisition unit 601 illustrated in FIG. 24.

In steps S2404 and S2405, the specifier 604A of the information acquisition unit 601 reads the reserved table 631 from the QueuePropertyBag 420 corresponding to the logical printer of the printer driver 303.

In step S2406, the specifier 604A of the information acquisition unit 601 uses the reserved table 631 thus acquired, thereby specifying the reserved entry 632 of information to be acquired (e.g., model capability 1203).

In steps S2407 and S2408, the acquirer 605A of the information acquisition unit 601 reads the reserved entry 632 specified by the specifier 604A, thereby acquiring the information such as the model capability 1203.

In step S2409, the information acquisition unit 601 notifies the configuration controller 323 of the information such as the model capability 1203 thus acquired.

In step S2410, the configuration controller 323 uses the information such as the model capability 1203 thus acquired, thereby generating capability information in the PrintCapabilities format.

In step S2411, the configuration controller 323 notifies the OS 302 of the capability information in the PrintCapabilities format thus generated.

In step S2412, the OS 302 uses the capability information thus notified, thereby notifying the application 301 of the capability information of the printer driver 303.

Through the processing described above, the configuration controller 323 of the printer driver 303 generates the capability information of the model added.

As described above, according to the embodiments of the present disclosure, in the client device 10 that executes the printer driver 303 (e.g., V4 printer driver, a printer driver having an architecture equal to the V4 printer driver), new information is added to a storage area corresponding to the logical printer thus being used.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings. For example, the image forming apparatus incorporating the fixing device according to an embodiment described above is not limited to a color printer as illustrated in FIG. 1, but may be a monochrome printer that forms a monochrome toner image on a recording medium. In addition, the image forming apparatus to which the embodiments of the present disclosure are applied includes but is not limited to a printer, a copier, a facsimile machine, or a multifunction peripheral having at least two capabilities of these devices.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Any one of the above-described operations may be performed in various other ways, for example, in an order different from that described above.

Further, any of the above-described devices or units can be implemented as a hardware apparatus, such as a special-purpose circuit or device, or as a hardware/software combination, such as a processor executing a software program.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by an application-specific integrated circuit (ASIC), prepared by interconnecting an appropriate network of conventional component circuits or by a combination thereof with one or more conventional general-purpose microprocessors and/or signal processors programmed accordingly.

What is claimed is:

1. An information processing apparatus comprising:
   a memory including a storage area corresponding to a printer driver, the storage area being a QueuePropertyBag, and the QueuePropertyBag including a reserved table and a plurality of available entries; and
   circuitry configured to
      install the printer driver by
         executing an installation file, the installation file including a configuration file, and
         preparing each of the plurality of available entries of the QueuePropertyBag as a registry entry copied from the configuration file,
      store, in at least one entry of the plurality of available entries of the QueuePropertyBag, additional information,
      associate, in the reserved table of the QueuePropertyBag, identification information of the additional information and the at least one entry having the additional information stored therein,
      determine the at least one entry storing the additional information, based on the identification information,
      acquire the additional information by reading the at least one entry, and
      instruct an image processing apparatus to perform image processing using the additional information.

2. The information processing apparatus according to claim 1,
   wherein the circuitry is further configured to specify the additional information based upon the identification information.

3. The information processing apparatus according to claim 1,
   wherein the identification information is stored in a registry entry in the storage area.

4. The information processing apparatus according to claim 1, wherein the circuitry is further configured to display a print setting screen according to the additional information.

5. The information processing apparatus according to claim 4, wherein the circuitry is further configured to use the additional information to convert print target data into print data, the print data useable by the image processing apparatus.

6. The information processing apparatus according to claim 4, wherein the circuitry is further configured to generate print setting information according to the additional information.

7. The information processing apparatus according to claim 6,
   wherein the circuitry is further configured to use the additional information to generate capability information on a function settable for printing.

8. The information processing apparatus according to claim 6, wherein the additional information includes conversion information useable for conversion between print setting information in a PrintTicket format and print setting information in a Devmode format.

9. The information processing apparatus according to claim 1, wherein the circuitry is further configured to execute a store device application to use the additional information to display a print setting screen for the image processing apparatus.

10. An information processing system comprising:
    the information processing apparatus according to claim 1, wherein
    the image processing apparatus is configured to execute image processing according to a request for image processing by the information processing apparatus.

11. The information processing apparatus according to claim 1, wherein the printer driver is a Version 4 printer driver.

12. The information processing apparatus according to claim 1, wherein the additional information represents a new printer model.

13. The information processing apparatus according to claim 12, wherein the new printer model is one of a plurality of printer models installed to the printer driver.

14. The information processing apparatus according to claim 1, wherein the additional information includes model wording information and model capability information.

15. The information processing apparatus according to claim 12, wherein the circuitry is further configured to display a print settings screen including features of the new printer model, by
    determining the at least one entry storing the additional information, based on the identification information, and
    acquiring the additional information associated with the new printer model by reading the at least one entry.

16. A method for processing information by an information processing apparatus, the information processing apparatus including a memory, the method comprising:
    providing, in the memory, a storage area corresponding to a printer driver, the storage area being a QueuePropertyBag, and the QueuePropertyBag including a reserved table and a plurality of available entries;
    installing the printer driver by
       executing an installation file, the installation file including a configuration file, and
       preparing each of the plurality of available entries of the QueuePropertyBag as a registry entry copied from the configuration file;
    storing, in at least one entry of the plurality of available entries of the QueuePropertyBag, additional information, and
    associating, in the reserved table of the QueuePropertyBag, identification information of the additional information and the at least one entry having the additional information stored therein;
    determining the at least one entry storing the additional information, based on the identification information,
    acquiring the additional information by reading the at least one entry; and
    instructing an image processing apparatus to perform image processing using the additional information.

17. A non-transitory computer-readable storage medium storing a computer-readable product that causes an information processing apparatus to execute a method for processing information, the method comprising:
    providing, in a memory, a storage area corresponding to a printer driver, the storage area being a QueuePropertyBag, and the QueuePropertyBag including a reserved table and a plurality of available entries;
    installing the printer driver by
       executing an installation file, the installation file including a configuration file, and
       preparing each of the plurality of available entries of the QueuePropertyBag as a registry entry copied from the configuration file;

storing, in at least one entry of the plurality of available entries of the QueuePropertyBag, additional information;
associating, in the reserved table of the QueueProperty-Bag, identification information of the additional information and the at least one entry having the additional information stored therein;
determining the at least one entry storing the additional information, based on the identification information;
acquiring the additional information by reading the at least one entry; and
instructing an image processing apparatus to perform image processing using the additional information.

* * * * *